(12) United States Patent
Shibui et al.

(10) Patent No.: US 7,633,255 B2
(45) Date of Patent: Dec. 15, 2009

(54) MOVEMENT CONTROLLER FOR CONTROLLING MOVEMENT OF MOBILE BODY OF MACHINE TOOL, MACHINE TOOL PROVIDED WITH MOVEMENT CONTROLLER, AND MOBILE BODY MOVING METHOD

(75) Inventors: Yutaka Shibui, Saku (JP); Hajime Matsumaru, Saku (JP); Keita Kazuie, Saku (JP)

(73) Assignee: Citizen Holdings Co., Ltd., Tokyo (JP)

( * ) Notice: Subject to any disclaimer, the term of this patent is extended or adjusted under 35 U.S.C. 154(b) by 538 days.

(21) Appl. No.: 11/628,736

(22) PCT Filed: Jun. 6, 2005

(86) PCT No.: PCT/JP2005/010725

§ 371 (c)(1),
(2), (4) Date: Dec. 7, 2006

(87) PCT Pub. No.: WO2005/121911

PCT Pub. Date: Dec. 22, 2005

(65) Prior Publication Data
US 2007/0241710 A1    Oct. 18, 2007

(30) Foreign Application Priority Data
Jun. 9, 2004    (JP) .............................. 2004-171421
Jun. 9, 2004    (JP) .............................. 2004-171811
Aug. 20, 2004    (JP) .............................. 2004-241127

(51) Int. Cl.
*G05B 19/33*    (2006.01)
(52) U.S. Cl. ...................................... 318/575; 318/574
(58) Field of Classification Search ................. 318/575, 318/574
See application file for complete search history.

(56) References Cited

FOREIGN PATENT DOCUMENTS

| JP | 7-134608 | 5/1995 |
| JP | 9-262742 | 10/1997 |
| JP | 11-104934 | 4/1999 |
| JP | 11-305819 | 11/1999 |

*Primary Examiner*—Bentsu Ro
*Assistant Examiner*—Erick Glass
(74) *Attorney, Agent, or Firm*—Finnegan, Henderson, Garrett & Dunner, L.L.P.

(57) ABSTRACT

At the time of two-dimensionally moving a mobile body of a machine tool, to a predetermined position, a speed of the mobile body is gently increased/decreased at an acceleration/deceleration equal to or less than the maximum acceleration/deceleration, from the time when the mobile body reaches a direction change point. Therefore, the moving time is shortened and a rapid acceleration/deceleration may be avoided.

18 Claims, 18 Drawing Sheets

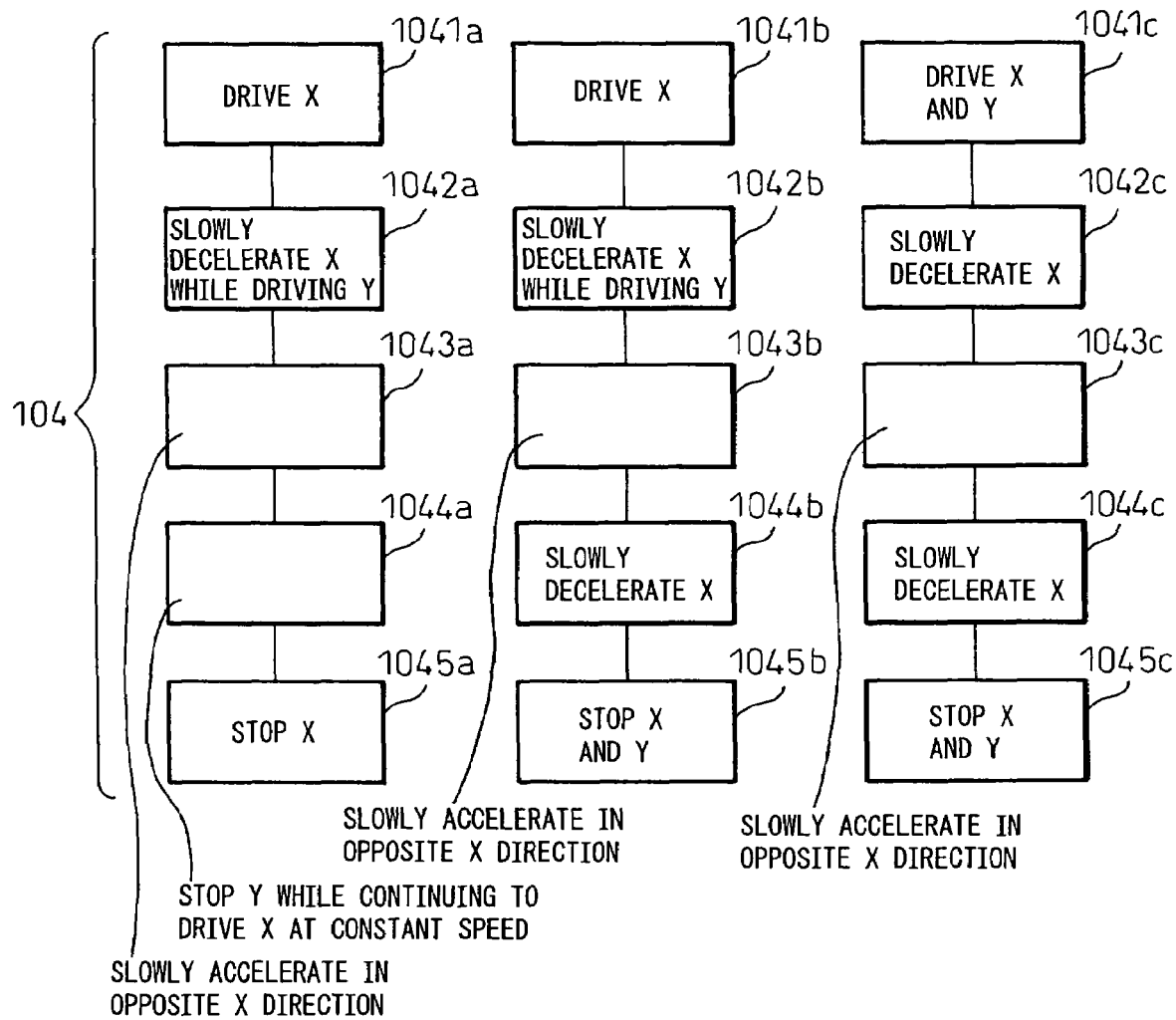

Fig.10a
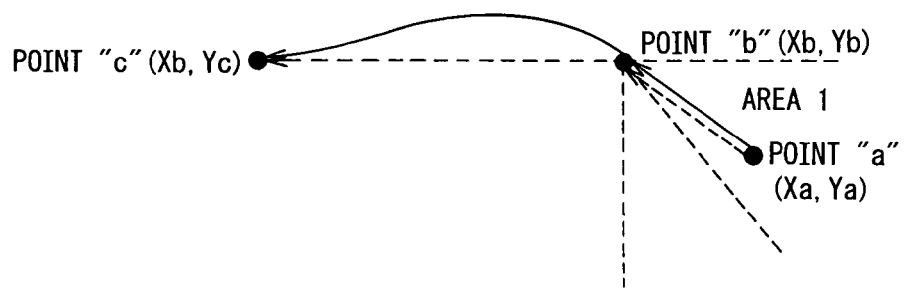
Fig.10b
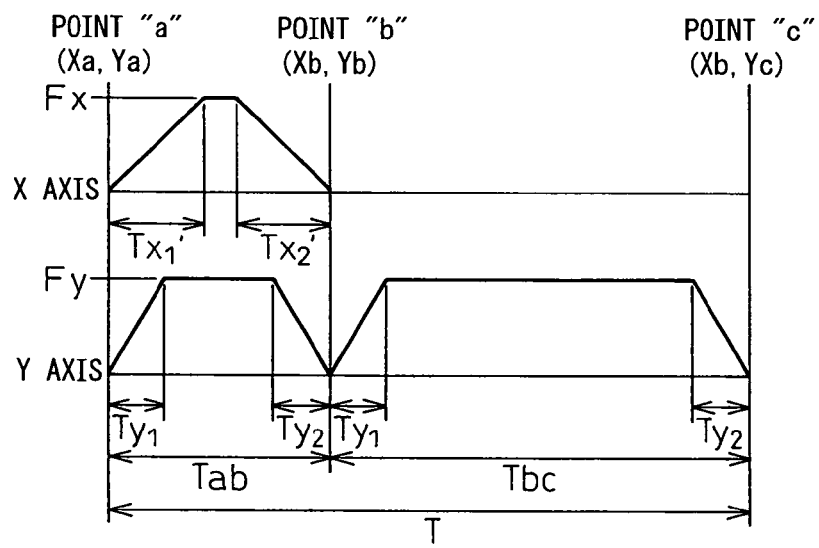
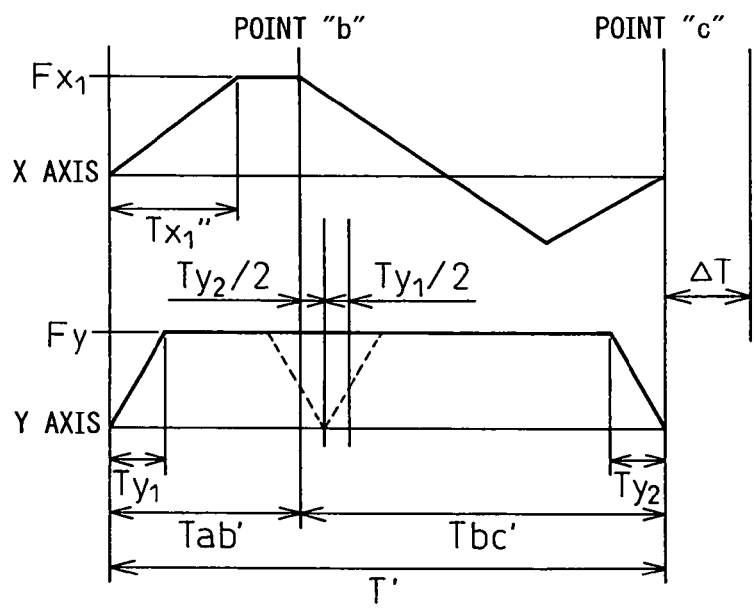

Fig.11a
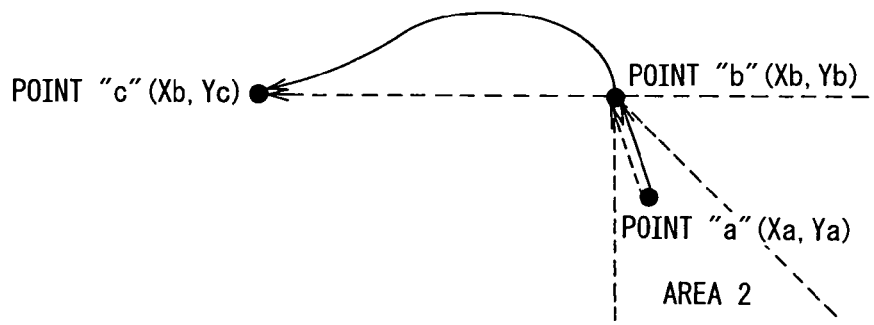
Fig.11b
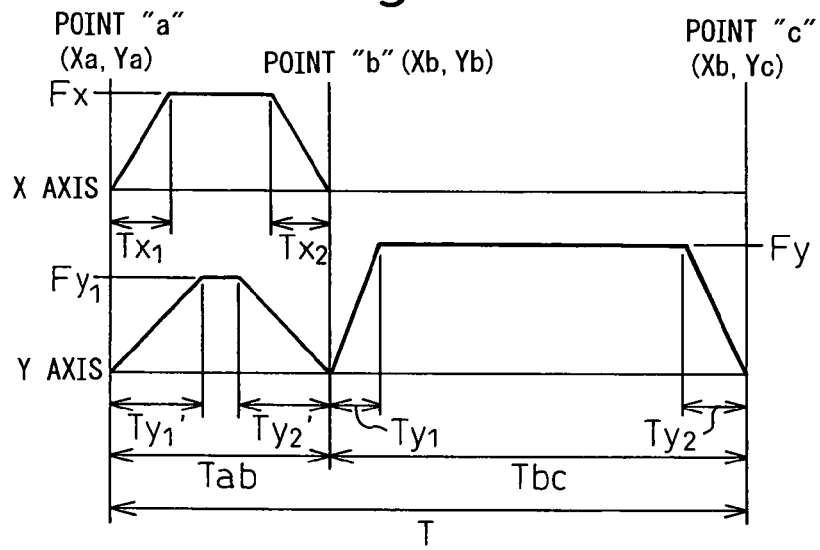
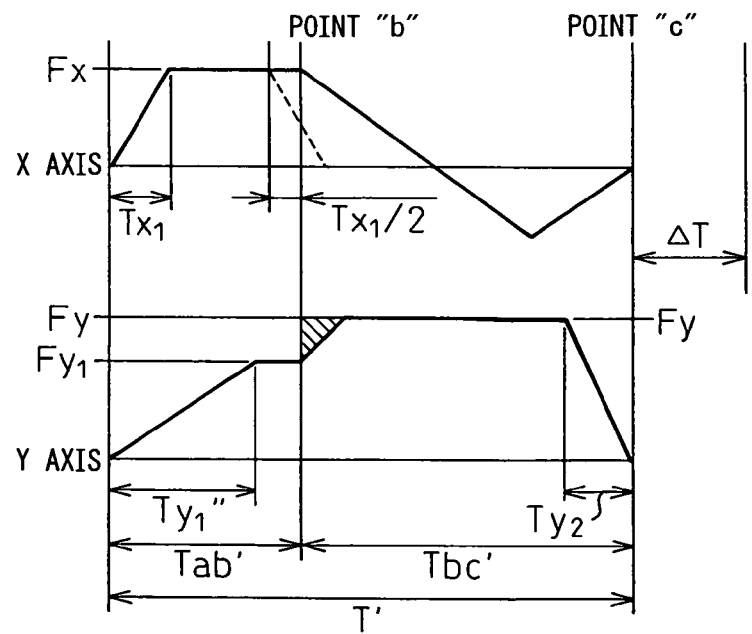

Fig.13a
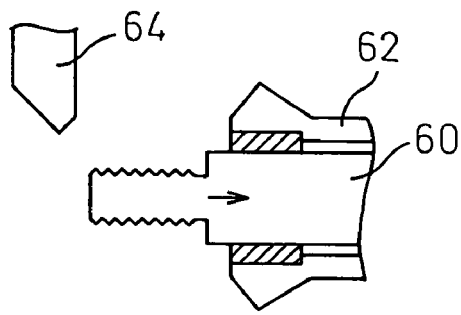
Fig.13d
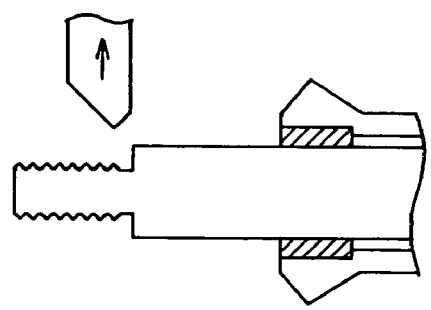
Fig.13b
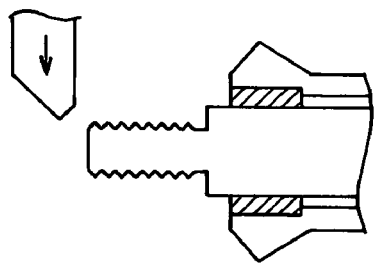
Fig.13c
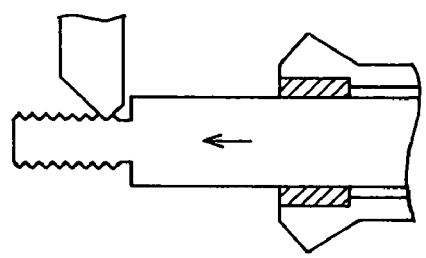
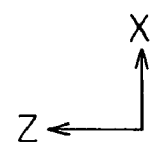
Fig.14
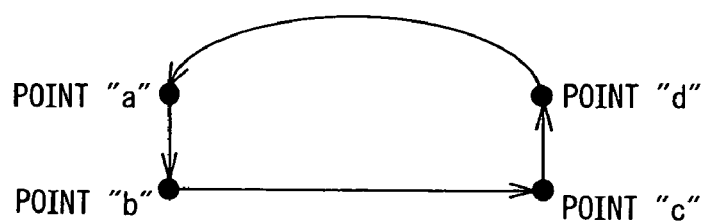

MOVEMENT CONTROLLER FOR CONTROLLING MOVEMENT OF MOBILE BODY OF MACHINE TOOL, MACHINE TOOL PROVIDED WITH MOVEMENT CONTROLLER, AND MOBILE BODY MOVING METHOD

BACKGROUND ART

1. Technical Field

The present invention relates to a movement controller for moving a mobile body of a machine tool to a designated position, a machine tool provided with such a movement controller, and a method for moving the mobile body.

2. Description of the Related Art

In a machine tool such as an automatic lathe, when machining one workpiece sequentially, and using a plurality of tools, it is common practice, as shown in FIG. 18, to move a mobile body 40, i.e., a tool post provided with a plurality of cutting tools, in a U-shaped or L-shaped path relative to a spindle 50 by using a servo motor. To accomplish this movement, the mobile body 40 is moved and stopped repeatedly in such a manner that the mobile body 40 is first moved by an X-axis driving unit, then by a Y-axis driving unit, and again by the X-axis driving unit.

FIG. 19a is a diagram showing in simplified form the moving path of the mobile body (for example, the tool post) when the mobile body moves in a U-shaped path as shown in FIG. 18. As shown, the mobile body first moves rectilinearly from a first position "a" (Xa, Ya) to a first direction change point "b" (Xb, Ya), then moves rectilinearly from the point "b" to a second direction change point "c" (Xb, Yc), and finally moves from the point "c" to a second position "d" (Xd, Yc). Here, when the mobile body moves from the point "a" to the point "b" and from the point "c" to the point "d", the mobile body is driven by the X-axis driving unit, and when the mobile body moves from the point "b" to the point "c", the mobile body is driven by the Y-axis driving unit. The points "b" and "c" are the points through which the mobile body has to pass when moving from the point "a" to "d" in order to avoid an obstacle located therebetween. That is, the mobile body does not move rectilinearly from the point "a" to the point "d", but always passes through direction change points that are not located on the straight line jointing the points "a" and "d".

FIG. 19b is a diagram showing how the driving speeds of the X-axis and Y-axis driving units as the first and second driving units capable of driving in the mutually orthogonal first and second axis directions, i.e., the X-axis and Y-axis directions, change with respect to time (i.e., the change over time of the moving speed along each axis direction) when the mobile body moves as shown in FIG. 19a. When moving the mobile body, each driving unit is controlled to operate at its maximum performance in order to shorten the overall moving time as much as possible. More specifically, first, one of the driving units (in the illustrated example, the X-axis driving unit) drives the mobile body from the point "a" by accelerating it with a predetermined or rated first maximum acceleration, i.e., with a minimum time constant $Tx_1$ and, once a first maximum moving speed Fx is reached, the mobile body is driven constantly at Fx for a predetermined length of time; then, as the mobile body approaches the point "b", the mobile body is decelerated with a predetermined or rated first maximum deceleration, i.e., with a minimum time constant $Tx_2$, until it comes to a stop at the point "b". Next, in a manner similar to the X-axis driving unit, the other driving unit (in the illustrated example, the Y-axis driving unit) drives the mobile body from the point "b" by accelerating it with a predetermined or rated second maximum acceleration, i.e., with a minimum time constant $Ty_1$ and, once a second maximum moving speed Fy is reached, the mobile body is driven constantly at Fy for a predetermined length of time; then, as the mobile body approaches the point "c", the mobile body is decelerated with a predetermined or rated second maximum deceleration, i.e., with a minimum time constant $Ty_2$, until it comes to a stop at the point "c". Finally, the X-axis driving unit moves the mobile body from the point "c" to the point "d" in the same manner that it was moved from the point "a" to the point "b".

Many attempts have been made to shorten the overall moving time including the move-and-stop operations described above. To shorten the overall moving time, it is advantageous to drive both driving units simultaneously during a certain part of the time, rather than driving one or the other of the driving units selectively. Japanese Unexamined Patent Publication No. H09-262742, for example, discloses a feed control method and apparatus in which feed motions are performed simultaneously in two axis directions. In this control method, when the tool is being fed only in the X-axis direction, the tool is also moved in the Z-axis direction before the tool reaches a designated X coordinate, thereby attempting to shorten the machining time. On the other hand, a rapid-feed control method for a mobile body of a machine tool is described in Japanese Unexamined Patent Publication No. H07-134608. This control method attempts to shorten the moving time by reducing the acceleration and deceleration time constants.

When moving a mobile body, provisions often have to be made to avoid interference with other members during the movement, while at the same time, achieving a reduction in the moving time. For example, Japanese Unexamined Patent Publication No. H11-104934 discloses a control method and apparatus for shortening the time it takes to move a tool changer to a tool change position. In this control method, an approach position P2 is set through which the tool changer must pass in order to avoid interference with other members when the tool changer moves from the current position P1 to the tool change position P3, and control is performed so that the tool changer moves without once stopping at P2.

When moving a mobile body such as a tool post in a U-shaped path, the mobile body is caused to stop and then restart at each corner of the letter U, i.e., at each direction change point to change direction from the first axis direction to the second axis direction or vice versa. More specifically, the mobile body is decelerated just before it reaches the corner corresponding to the end of the axis direction along which it is being moved; then, after once stopping at the corner, the mobile body is accelerated to move along the other axis direction. Generally, in order to minimize the moving time, the deceleration and acceleration operations are performed with the maximum deceleration and acceleration that the mobile body driving unit can provide, i.e., with the minimum time constant. At this time, a large mechanical impact such as vibration is applied or damage is caused to the ball screw and other components of the driving unit, and this has been one of the causes that shorten the service life of the components. The method described in Japanese Unexamined Patent Publication No. H09-262742 aims to shorten the moving time, but with this method, the mobile body cannot be moved so as to pass through the second point (the point "c" in FIG. 19a) provided in order to avoid interference; besides, no description is given about the way to reduce the mechanical impact. With the method described in Japanese Unexamined Patent Publication No. H07-134608, the mechanical impact may become more pronounced, since the time constant for the acceleration and deceleration of the mobile body is reduced. On the other hand, with the method described in Japanese Unexamined Patent Publication No. H11-104934, the moving time of the mobile body, i.e., the tool changer, can be reduced while preventing the mobile body from interfering with other members, but since the mobile body is caused to abruptly change direction at the point (P2) through which the mobile body passes in order to avoid interference, it is considered that, at P2 also, the X-axis and Y-axis driving units each apply a rapid acceleration or deceleration to the mobile body. In Japanese Unexamined Patent Publication No. H11-104934 also, there is no mention of a way to reduce the mechanical impact.

SUMMARY OF THE INVENTION

Accordingly, it is an object of the present invention to provide a moving method wherein, when moving a mobile body of a machine tool or the like to a prescribed position via a direction change point which is set in order to avoid interference with other members during the movement, rapid acceleration and deceleration of the mobile body is avoided as much as possible, thereby minimizing the vibration associated with the direction changing of the mobile body, while at the same time, achieving a reduction in moving time. It is another object of the invention to provide a movement controller for implementing the above method. It is a further object of the invention to provide a machine tool equipped with the movement controller thereby achieving high-precision machining substantially free from vibration.

For use in a machine tool having at least one mobile body movable between a first position and a second position in a coordinate system containing mutually perpendicular first and second axes, and a first axis driving unit and a second axis driving unit for moving the mobile body in directions parallel to the first and second axes, respectively, the present provides, to achieve the above object, a movement controller for controlling the first axis driving unit and the second axis driving unit so that the mobile body moving between the first position and the second position passes through at least one direction change point that does not lie on a straight line joining the first position to the second position, wherein the movement controller includes a driving control section for controlling the first axis driving unit and the second axis driving unit so that after the mobile body has reached the at least one direction change point, the first axis driving unit accelerates and decelerates the mobile body in the first-axis direction with an acceleration and deceleration smaller than a predetermined first maximum acceleration and first maximum deceleration that the first axis driving unit can provide, and so that the acceleration and deceleration is performed continuously over a part or the entire length of the time during which the second axis driving unit is driven after the direction change point is reached.

When the movement controller controls the first axis driving unit and the second axis driving unit so that the mobile body passes through first and second direction change points whose coordinates along the first axis are the same, the driving control section can control the first axis driving unit and the second axis driving unit so that the first axis driving unit accelerates and decelerates the mobile body in the above described manner while the mobile body is being moved by the second axis driving unit from the first direction change point to the second direction change point.

In that case, the driving control section can control the first axis driving unit and the second axis driving unit in the following manner: the first axis driving unit accelerates the mobile body in the first-axis direction with the first maximum acceleration, and then drives the mobile body constantly at a predetermined first maximum moving speed until the mobile body reaches the first direction change point; after the mobile body has reached the first direction change point, the second axis driving unit accelerates the mobile body in the second-axis direction with a predetermined second maximum acceleration toward the second direction change point, and after reaching a predetermined second maximum moving speed, the second axis driving unit drives the mobile body constantly at that speed and then decelerates the mobile body with a predetermined second maximum deceleration just before reaching the second direction change point at which the movement in the second-axis direction stops; and after the mobile body has reached the first direction change point, the first axis driving unit decelerates the mobile body with a deceleration smaller than the first maximum deceleration so that the moving speed of the mobile body in the first-axis direction becomes zero when the mobile body reaches a midpoint between the first direction change point and the second direction change point and, after reaching the midpoint, the first axis driving unit accelerates the mobile body with an acceleration smaller than the first maximum acceleration in a direction opposite to the direction in which the mobile body was moved up to the midpoint, and drives the mobile body at the first maximum moving speed after reaching the second direction change point.

When the machine tool has first and second mobile bodies movable relative to each other, and when the movement controller controls the first axis driving unit and the second axis driving unit so that the first mobile body passes through first and second direction change points whose coordinates along the first axis are the same, the driving control section can control the first axis driving unit and the second axis driving unit so that the first axis driving unit accelerates and decelerates the first mobile body in the earlier described manner while the first mobile body is being moved from the first direction change point to the second direction change point in a relative fashion by moving the second mobile body by the second axis driving unit.

In that case, the driving control section can control the first axis driving unit and the second axis driving unit in the following manner: the first axis driving unit accelerates the first mobile body in the first-axis direction with the first maximum acceleration, and then drives the first mobile body constantly at a predetermined first maximum moving speed until the first mobile body reaches the first direction change point; after the first mobile body has reached the first direction change point, the second axis driving unit accelerates the second mobile body with a predetermined second maximum acceleration, and after reaching a predetermined second maximum moving speed, the second axis driving unit drives the second mobile body constantly at that speed and then decelerates the second mobile body with a predetermined second maximum deceleration just before reaching the second direction change point at which the movement in the second-axis direction stops; and after the first mobile body has reached the first direction change point, the first axis driving unit decelerates the first mobile body with a deceleration smaller than the first maximum deceleration so that the moving speed of the first mobile body in the first-axis direction becomes zero when the first mobile body reaches a midpoint between the first direction change point and the second direction change point and, after reaching the midpoint, the first axis driving unit accelerates the first mobile body with an acceleration smaller than the first maximum acceleration in a direction opposite to the direction in which the first mobile body was moved up to the midpoint, and drives the first mobile body at the first maximum moving speed after reaching the second direction change point.

When the movement controller controls the first axis driving unit and the second axis driving unit so that the mobile body passes through one direction change point whose coordinate along the first axis is the same as that of the second position, the driving control section can control the first axis driving unit and the second axis driving unit so that the first axis driving unit accelerates and decelerates the mobile body in the earlier described manner while the mobile body is being moved by the second axis driving unit from the direction change point to the second position.

In that case, the driving control section can control the first axis driving unit and the second axis driving unit in the following manner: the first axis driving unit accelerates the mobile body in the first-axis direction with the first maximum acceleration, and then drives the mobile body constantly at the first maximum moving speed until the mobile body reaches the direction change point; after the mobile body has reached the direction change point, the second axis driving unit accelerates the mobile body in the second-axis direction with a predetermined second maximum acceleration toward the second position, and after reaching a predetermined second maximum moving speed, the second axis driving unit drives the mobile body constantly at that speed and then decelerates the mobile body with a predetermined second maximum deceleration just before reaching the second position so that the mobile body stops at the second position; and after the mobile body has reached the direction change point, the first axis driving unit decelerates the mobile body with a deceleration smaller than the first maximum deceleration so that the moving speed of the mobile body in the first-axis direction becomes zero before the mobile body reaches the second position and, when the speed in the first-axis direction becomes zero, the first axis driving unit accelerates the mobile body with an acceleration smaller than the first maximum acceleration in a direction opposite to the first direction, and then decelerates the mobile body with a deceleration smaller than the first maximum deceleration so that when the second-axis coordinate of the mobile body becomes equal to the second-axis coordinate of the second position, the first-axis coordinate of the mobile body also equals the first-axis coordinate of the second position, and so that the mobile body stops upon reaching the second position.

When the machine tool has first and second mobile bodies movable relative to each other, and when the movement controller controls the first axis driving unit and the second axis driving unit so that the first mobile body passes through one direction change point whose coordinate along the first axis is the same as that of the second position, the driving control section can control the first axis driving unit and the second axis driving unit so that the first axis driving unit accelerates and decelerates the first mobile body in the earlier described manner while the first mobile body is being moved from the direction change point to the second position in a relative fashion by moving the second mobile body by the second axis driving unit.

In that case, the driving control section can control the first axis driving unit and the second axis driving unit in the following manner: the first axis driving unit accelerates the first mobile body in the first-axis direction with the first maximum acceleration, and then drives the first mobile body constantly at the first maximum moving speed until the first mobile body reaches the direction change point; after the first mobile body has reached the direction change point, the second axis driving unit accelerates the second mobile body with a predetermined second maximum acceleration, and after reaching a predetermined second maximum moving speed, the second axis driving unit drives the second mobile body constantly at that speed and then decelerates the second mobile body with a predetermined second maximum deceleration just before reaching the second position at which the movement in the second-axis direction stops; and after the first mobile body has reached the direction change point, the first axis driving unit decelerates the first mobile body with a deceleration smaller than the first maximum deceleration so that the moving speed of the first mobile body in the first-axis direction becomes zero before the first mobile body reaches the second position and, when the speed in the first-axis direction becomes zero, the first axis driving unit accelerates the first mobile body with an acceleration smaller than the first maximum acceleration in a direction opposite to the first direction, and then decelerates the first mobile body with a deceleration smaller than the first maximum deceleration so that when the second-axis coordinate of the first mobile body becomes equal to the second-axis coordinate of the second position, the first-axis coordinate of the first mobile body also equals the first-axis coordinate of the second position, and so that the first mobile body stops upon reaching the second position.

The present invention also provides a machine tool equipped with the above-described movement controller.

For use in a machine tool having at least one mobile body movable between a first position and a second position in a coordinate system containing mutually perpendicular first and second axes, the present invention provides a movement controller for moving the mobile body between the first position and the second position, comprising: a storage section which stores a first maximum moving speed for the mobile body to be moved along the first axis, a first maximum acceleration and first maximum deceleration for the mobile body to be accelerated and decelerated between the first maximum moving speed and zero speed, a second maximum moving speed for the mobile body to be moved along the second axis, and a second maximum acceleration and second maximum deceleration for the mobile body to be accelerated and decelerated between the second maximum moving speed and zero speed; a direction change point setting section which, based on the specified first and second positions, sets a direction change point within the coordinate system at a position spaced away from a straight line joining the first and second positions; an acceleration/deceleration computing section which computes, as values smaller than the first maximum acceleration and the first minimum deceleration, the acceleration and deceleration with which the mobile body is accelerated and decelerated along the first axis during a period starting from the time that the mobile body passes the direction change point set by the direction change point setting section until the time that the mobile body reaches the next direction change point or a stopping point; a mode-of-movement computing section which, based on the acceleration and deceleration computed by the acceleration/deceleration computing section and on the second maximum acceleration and the second maximum deceleration stored in the storage section, computes the mode of movement of the mobile body so that the movement of the mobile body along the second axis is completed while the mobile body is being accelerated and decelerated along the first axis; and a driving control section which moves the mobile body from the first position to the second position via the direction change point by controlling the movement of the mobile body along the first axis and the movement of the mobile body along the second axis in accordance with the mode of movement computed by the mode-of-movement computing section.

Further, for use in a machine tool having at least one mobile body movable between a first position and a second position in a coordinate system containing mutually perpendicular first and second axes, and a first axis driving unit and a second axis driving unit for moving the mobile body in directions parallel to the first and second axes, respectively, the present invention provides a moving method for moving the mobile body by controlling the first axis driving unit and the second axis driving unit so that the mobile body moving between the first position and the second position passes through at least one direction change point that does not lie on a straight line joining the first position to the second position, the method comprising: after the mobile body has reached the at least one direction change point, accelerating and decelerating the mobile body in the first-axis direction by the first axis driving unit with an acceleration and deceleration smaller than a predetermined first maximum acceleration and first maximum deceleration that the first axis driving unit can provide; and performing the acceleration and deceleration continuously over a part or entire length of a time during which the second axis driving unit is driven after the direction change point is reached.

The present invention also provides, for use in a machine tool having at least one mobile body movable between a first position and a second position in a coordinate system containing mutually perpendicular first and second axes, a moving method for moving the mobile body between the first position and the second position, comprising: setting a first maximum moving speed for the mobile body to be moved along the first axis and a first maximum acceleration and first maximum deceleration for the mobile body to be accelerated and decelerated between the first maximum moving speed and zero speed; setting a second maximum moving speed for the mobile body to be moved along the second axis and a second maximum acceleration and second maximum deceleration for the mobile body to be accelerated and decelerated between the second maximum moving speed and zero speed; setting a direction change point within the coordinate system at a position spaced away from a straight line joining the first and second positions; when moving the mobile body from the first position to the second position via the direction change point, accelerating and decelerating the mobile body along the first axis with an acceleration and deceleration smaller than the first maximum acceleration and the first minimum deceleration during a period starting from the time that the mobile body passes the direction change point until the time that the mobile body reaches the next direction change point or a stopping point, while at the same time, moving the mobile body with the second maximum acceleration and the second maximum deceleration along the second axis and completing the movement along the second axis while the mobile body is being moved along the first axis.

According to one embodiment of the present invention, there is provided, for use in a machine tool having a mobile body movable along an arbitrary direction between arbitrary points set within a two-dimensional plane, a stationary block placed within a movable range of the mobile body, and a driving unit for moving the mobile body in the arbitrary direction to accomplish the positioning thereof, a controller for controlling the driving unit, comprising: a processing section which sets a moving path that the mobile body should take between the arbitrary positions set as first and second positions so that the mobile body does not interfere with the stationary block and so that the moving path does not contain a sharp angular corner but at least partially contains an arcuate line; and a driving control section which controls the driving unit so that the mobile body moves along the moving path set by the processing section.

The processing section can set a first interference check point on the mobile body as a point that comes closest to the stationary block when the mobile body moves from the first position to the second position over the shortest distance, a second interference check point on the stationary block as a point that comes closest to the mobile body when the mobile body moves from the first position to the second position over the shortest distance, and a relay point through which the first interference check point passes during the movement of the mobile body along the moving path so that the first interference check point and the second interference check point do not interfere with each other, and the driving control section can move the mobile body so that the first interference check point on the mobile body passes through the relay point, based on the first interference check point, the second interference check point, and the relay point set by the processing section.

Further, for use in a machine tool having: a spindle post for rotatably supporting a spindle capable of rotating with first work held thereon; a back spindle post equipped with a back spindle, which has an axis parallel to the axis of the spindle, is disposed so as to face the spindle, and is capable of rotating with second work held thereon, and one or more first tools which performs cutting operations on the first work held on the spindle, wherein the back spindle post is movable in the axial direction of the spindle as well as in an arbitrary direction perpendicular to the axis; a stationary tool post disposed within a movable range of the back spindle post and equipped with one or more second tools which performs cutting operations on the second work held on the back spindle; and a driving unit for moving the back spindle post to an arbitrary position in an arbitrary direction to accomplish the positioning thereof, there is provided according to the present invention a controller for controlling the driving unit, comprising: a processing section which sets a moving path that the back spindle post should take between the arbitrary positions set as first and second positions, with the stationary tool post interposed therebetween, so that the back spindle post does not interfere with the stationary tool post and so that the moving path does not contain a sharp angular corner but at least partially contains an arcuate line; and a driving control section which controls the driving unit so that the back spindle post moves along the moving path set by the processing section.

The processing section can set a first interference check point as a point of intersection at which a straight line that is tangent to a forward end of the first tool whose forward end protrudes most among the first tools mounted on the back spindle post or to a forward end of the second work held on the back spindle, whichever protrudes farther toward the spindle post, and that is perpendicular to the axis of the back spindle, intersects a straight line that passes through an end point of the back spindle post which is closest to the stationary tool post in the direction of the perpendicular line, and that is parallel to the axis of the back spindle, a second interference check point as a point of intersection at which a straight line that is tangent to a forward end of the second tool whose forward end protrudes most among the second tools mounted on the stationary tool post, and that is perpendicular to the axis of the back spindle, intersects a straight line that passes through an end point of the stationary tool post which is closest to the back spindle post in the direction of the perpendicular line, and that is parallel to the axis of the back spindle, and a relay point through which the first interference check point passes during the movement of the back spindle post along the moving path so that the first interference check point and the second interference check point do not interfere with each other, and the driving control section can move the back spindle post so that the first interference check point on the back spindle post passes through the relay point, based on the first interference check point, the second interference check point, and the relay point set by the processing section.

The processing section can set a border line that passes through the second interference check point and that is perpendicular to the axis of the back spindle, and can set the relay point on the border line. Alternatively, the processing section can set in advance a border line that is perpendicular to the axis of the back spindle, and can set the relay point on the border line.

The processing section can set three points, i.e., a point S1 that lies on the border line and that is closest to the second interference check point and outside the stationary tool post, a point of intersection S2, at which the straight line extending from the first interference check point in parallel to the axis of the back spindle when the back spindle post, is located at the first position intersects the border line, and an intermediate point S3 that is located between the point S1 and the point of intersection S2 on the border line; then, when moving the back spindle post from the first position to the second position, the processing section can perform three modes of operation, each by having the first interference check point pass through one of the three points and measuring the moving time, and can select from among the three points the point that yielded the shortest moving time and store that point as the relay point.

The moving path further includes a straight line connecting to the arcuate line; preferably, the straight line is a tangent to the arcuate line at the point connecting to the arcuate line. Alternatively, the entire moving path may be constructed from an arcuate line.

The present invention provides a machine tool equipped with the above-described controller.

According to the present invention, there is provided, for use in a machine tool having a mobile body movable along an arbitrary direction between arbitrary points set within a two-dimensional plane, a stationary block placed within a movable range of the mobile body, and a driving unit for moving the mobile body in the arbitrary direction to accomplish the positioning thereof, a moving method for moving the mobile body, comprising: setting a moving path that the mobile body should take between the arbitrary positions set as first and second positions so that the mobile body does not interfere with the stationary block and so that the moving path does not contain a sharp angular corner but at least partially contains an arcuate line; and controlling the driving unit so that the mobile body moves along the moving path set by the processing section.

The moving method may include: setting a first interference check point on the mobile body as a point that comes closest to the stationary block when the mobile body moves from the first position to the second position over the shortest distance; setting a second interference check point on the stationary block as a point that comes closest to the mobile body when the mobile body moves from the first position to the second position over the shortest distance; setting a relay point through which the first interference check point passes during the movement of the mobile body along the moving path so that the first interference check point and the second interference check point do not interfere with each other; and moving the mobile body so that the first interference check point on the mobile body passes through the relay point, based on the first interference check point, the second interference check point, and the relay point set by the processing section.

BRIEF DESCRIPTION OF THE DRAWINGS

The above and other objects, features, and advantages of the present invention will become more apparent from the description of the preferred embodiments as set forth below with reference to the accompanying drawings, wherein:

FIG. 2b is a diagram showing a moving path of a mobile body for the case of FIG. 2a;

FIGS. 3a, 3b, and 3c are flowcharts each showing the details of one of the steps in FIG. 1, for the cases of FIG. 2a, FIG. 8b, and FIG. 10c, respectively;

FIG. 10a is a diagram similar to FIG. 5 showing the moving path according to the moving method of the present invention for comparison with the prior art moving method when the movement starting point of the mobile body is located in area 1;

FIG. 10b is a diagram showing in the upper part the change of the driving speed of each axis driving unit when the mobile body moves along dashed lines in FIG. 10a according to the prior art moving method, and in the lower part the change of the driving speed of each axis driving unit when the mobile body moves along solid lines in FIG. 10a according to the moving method of the present invention;

FIG. 11a is a diagram similar to FIG. 5 showing the moving path according to the moving method of the present invention for comparison with the prior art moving method when the movement starting point of the mobile body is located in area 2;

FIG. 11b is a diagram showing in the upper part the change of the driving speed of each axis driving unit when the mobile body moves along dashed lines in FIG. 11a according to the prior art moving method, and in the lower part the change of the driving speed of each axis driving unit when the mobile body moves along solid lines in FIG. 11a according to the moving method of the present invention;

FIGS. 13a to 13d are diagrams showing the positional relationship between a tool and a workpiece when cutting a screw thread, the diagrams respectively showing the condition in which the tool is located in its standby position, the condition in which the tool is moved to the machining position, the condition in which the workpiece is moving during machining, and the condition in which the tool is moved back to its standby position;

FIG. 14 is a diagram showing the moving path of the tool relative to the workpiece during screw threading according to the present invention;

FIG. 19b is a diagram showing the change of the driving speed of each axis driving unit when the mobile body moves along the moving path of FIG. 19a;

DETAILED DESCRIPTION

Figure 1:
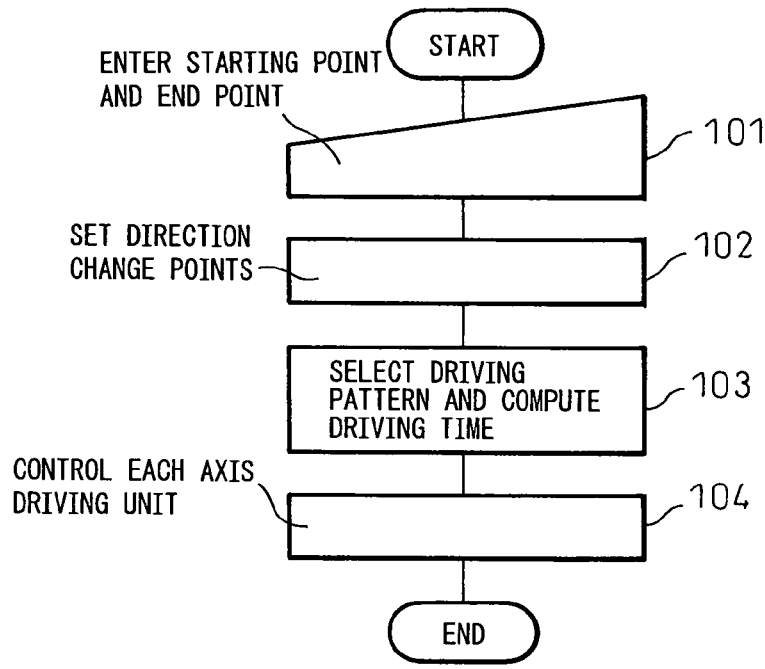
FIG. 1 is a flowchart showing one embodiment of a mobile body moving method according to the present invention.

The present invention will be described in detail below with reference to the drawings. FIG. 1 is a diagram showing a general flow of a moving method according to the present invention. First, the coordinates of first position "a" and second position "d" of a mobile body are input (step 101). Next, the coordinates of direction change points "b" and "c" through which the mobile body should pass during movement are set based on the coordinates of the points "a" and "d" and the dimensions, etc. of the mobile body (step 102). Next, based on the coordinates of the respective points "a" to "d" and the maximum acceleration and deceleration and maximum moving speed predetermined for each axis driving unit, the driving pattern of each axis driving unit, i.e., the mode of movement of the mobile body, is selected, and its driving time is computed (step 103). Finally, control is performed so that each axis driving unit operates in accordance with the thus determined driving pattern and driving time (step 104).

Figure 19A:
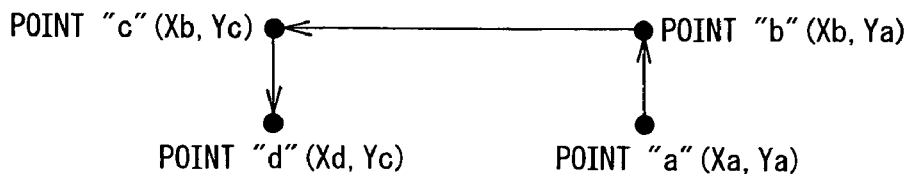
FIG. 19a is a diagram showing a U-shaped moving path for the mobile body in the machine tool according to the prior art.

The detailed operation performed in step 104 differs depending on the mode of movement of the mobile body determined in step 103. First, the operation will be described for the case of a U-shaped movement such as shown in FIG. 19a, by referring to FIGS. 2a and 2b in conjunction with FIG. 3a which illustrates the detailed operation performed in step 104 to accomplish the movement. In FIG. 3a and FIGS. 3b and 3c to be described later, the X-axis and Y-axis driving units are simply designated as X and Y, respectively, and when each axis driving unit is driven with an acceleration or deceleration smaller than its maximum acceleration or deceleration, that is, when the axis driving unit is accelerated or decelerated with a time constant larger than its minimum time constant, such acceleration or deceleration is referred to simply as slow acceleration or slow deceleration, respectively.

Figure 2A:
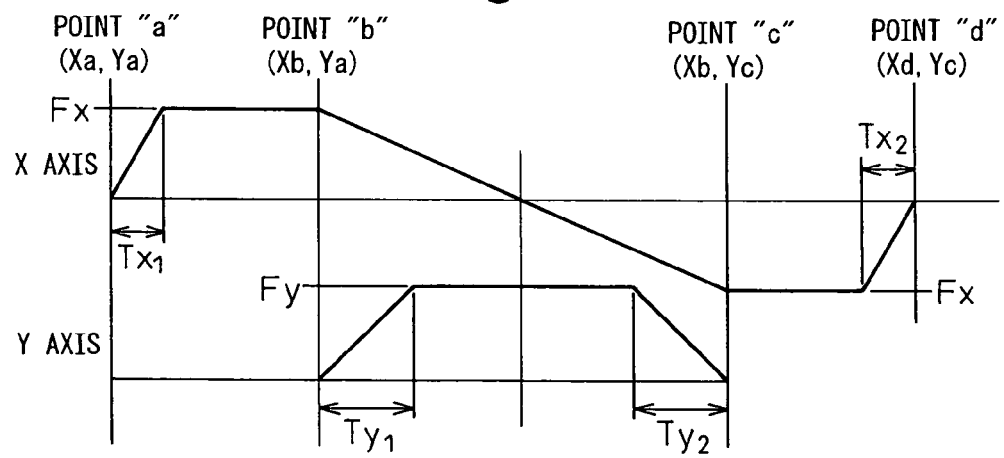
FIG. 2a is a diagram showing the change of the driving speed of each axis driving unit according to the mobile body moving method of the present invention, as compared with that shown in FIG. 19b.
Figure 19B:
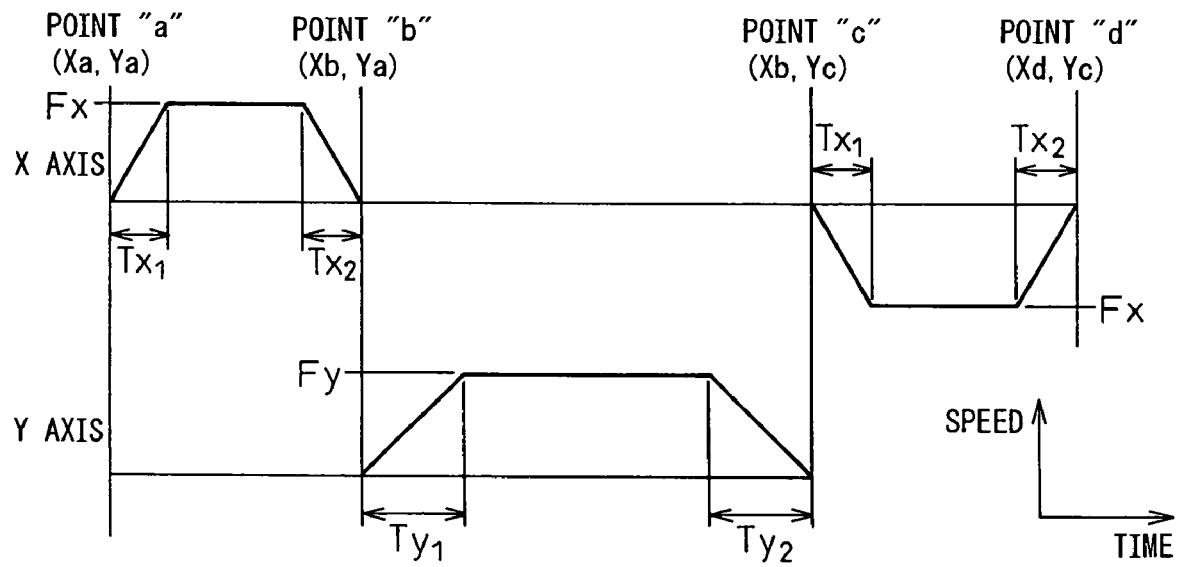

FIG. 2a is a diagram similar to FIG. 19b, and shows the change over time of the moving speed of the mobile body in the X-axis and Y-axis directions according to the moving method of the present invention. As shown, the X-axis driving unit first drives the mobile body from the point "a" with a first maximum acceleration, and then drives the mobile body constantly at a first maximum moving speed for a predetermined length of time; the operation up to this point is the same as that in the prior art. However, unlike the prior art, when the mobile body approaches the point "b", the mobile body is not decelerated, and does not stop at the point "b". That is, the X-axis driving unit continues to drive the mobile body at the first maximum moving speed until the mobile body reaches the point "b" (step 1041a in FIG. 3a).

Next, the instant that the mobile body reaches the point "b", the Y-axis driving unit begins to accelerate the mobile body with a second maximum acceleration and, after reaching a second maximum moving speed, drives the mobile body constantly at that speed for a predetermined length of time. On the other hand, when the mobile body reaches the point "b", the X-axis driving unit begins to slowly decelerate the mobile body with a deceleration smaller than a first maximum deceleration (that is, with a time constant larger than the minimum time constant) (step 1042a). Then, when the mobile body reaches the midpoint between the point "b" and the point "c" as measured in terms of Y coordinates, the moving speed in the X-axis direction temporarily becomes zero, and then slowly increases again, this time in the opposite direction (step 1043a). This slow deceleration and reacceleration are controlled so that the moving speed in the X-axis direction becomes maximum when the mobile body reaches the point "c". That is, for the entire duration of time that the Y-axis driving unit is operating, the X-axis driving unit is controlled so that the mobile body is slowly decelerated from its maximum moving speed with a constant deceleration and, when the speed in the X-axis direction becomes zero, the mobile body is slowly accelerated with a constant acceleration until it reaches the point "c" at which the moving speed reaches a maximum moving speed whose direction is opposite to the direction of the maximum speed reached at the point "b". Accordingly, unlike the prior art, the mobile body does not temporarily stop at the point "c".

As for the driving of the Y-axis driving unit near the point "c", the same method as that employed in the prior art may be used. That is, the Y-axis driving unit is controlled so that as the mobile body approaches the point "c", the mobile body is decelerated with the second maximum deceleration, i.e., with the minimum time constant for deceleration, until the moving speed in the Y-axis direction becomes zero at the point "c" (step 1044*a*). However, since the moving speed in the X-axis direction reaches maximum at the point "c", the mobile body does not stop at the point "c", but moves toward the point "d" while maintaining the maximum moving speed. Finally, just before the point "d", the mobile body is decelerated with the first maximum deceleration, until it comes to a stop at the point "d" (step 1045*a*), thus completing the moving operation.

According to the moving method described above, while securing the moving path (passing through the points "b" and "c") for the mobile body so as not to interfere with other members, the deceleration to the point "b" and the acceleration from the point "c" can be made slower for the X-axis direction (that is, the mobile body can be decelerated and accelerated with a larger time constant) compared with the prior art. That is, while, in the prior art, the X-axis driving unit performs the acceleration and deceleration with the minimum time constant twice, in the present invention the X-axis driving unit performs the acceleration and deceleration with the minimum time constant only once, and instead performs slower acceleration and deceleration (with a larger time constant) once. In this way, the number of accelerations and decelerations with the minimum time constant, which can impose a large impact on machine tools, can be reduced, thus reducing vibrations and shocks caused by rapid acceleration and deceleration; this not only serves to reduce any adverse effect on the machining accuracy of other work being done on the same machine tool, but also contributes to substantially extending the service life of parts such as the ball screws of the driving units.

Figure 2B:
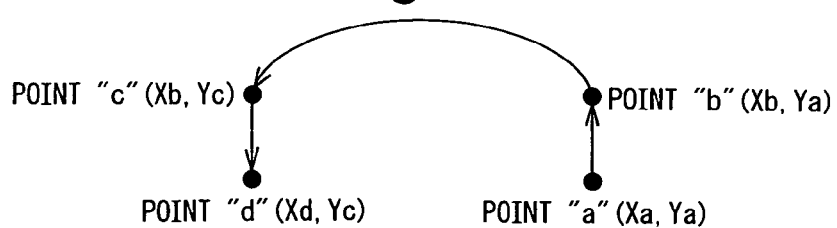

When the driving units are operated as shown in FIG. 2*a*, the moving path of the mobile body from the point "a" to the point "b" and the path from the point "c" to the point "d" are both straight lines, as in the prior art, but the moving path in its entirety is not exactly the same as the U-shaped path of the prior art which consists only of three straight lines; that is, in the present invention, the path between the points "b" and "c" is convex upward in the direction opposite the points "a" and "d", as shown in FIG. 2*b*. More specifically, since the mobile body moving in the X-axis direction reaches the point "b" while maintaining the maximum moving speed, the mobile body continues to move in the X-axis direction as well as in the Y-axis direction, but the moving speed in the X-axis direction is slowly decreased; as a result, the path from the point "b" to the midpoint between the points "b" and "c" is curved upward, forming a curved line extending upward in the direction opposite the point "a" with respect to the point "b". On the other hand, from the midpoint between the points "b" and "c" to the point "c", the moving speed in the X-axis direction once becomes zero at the midpoint between the points "b" and "c", but thereafter, the mobile body is slowly accelerated in the X-axis direction; as a result, the path from the midpoint between the points "b" and "c" to the point "c" is curved downward, forming a curved line extending downward in the same direction as the point "a" with respect to the point "b".

The above moving method has the effect of being able to reduce the overall moving time as well as the effect of reducing the impact associated with rapid acceleration and deceleration of the driving units. This will be explained with reference to FIG. 4 which shows FIGS. 19*b* and 2*a* one above the other for comparison.

The difference in overall moving time between the present invention and the prior art will be described. First, the overall moving time T from the point "a" to the point "d" according to the prior art moving method is the sum of the moving time Tab from the point "a" to the point "b", the moving time Tbc from the point "b" to the point "c", and the moving time Tcd from the point "c" to the point "d". Likewise, the overall moving time T' from the point "a" to the point "d" according to the moving method of the present invention is the sum of the moving time Tab' from the point "a" to the point "b", the moving time Tbc' from the point "b" to the point "c", and the moving time Tcd' from the point "c" to the point "d". Hence, the following equations hold.

$$T = Tab + Tbc + Tcd \tag{1}$$

$$T' = Tab' + Tbc' + Tcd' \tag{2}$$

In the above equations (1) and (2), Tab represents the sum of the time constant $Tx_1$ for the first maximum acceleration, the moving time $Txm_1$ with the first maximum moving speed Fx, and the time constant $Tx_2$ for the first maximum deceleration. On the other hand, Tab' represents the sum of the time constant $Tx_1$ for the maximum acceleration and the moving time $Txm_1'$ with the maximum moving speed. Since the area bounded by the horizontal axis and the curve is equal to the moving distance of the mobile body, the equation $Txm_1' = Txm_1 + Tx_2/2$ should hold for the mobile body to reach the point "b" at the end of $Txm_1'$. Here, it is assumed that the moving speed during acceleration and declaration changes linearly (that is, the acceleration and the declaration are constant values). From the above, the following equations hold.

$$Tab = Tx_1 + Txm_1 + Tx_2 \tag{3}$$

$$Tab' = Tx_1 + Txm_1' = Tx_1 + Txm_1 + Tx_2/2 \tag{4}$$

The same principle also applies for the moving time from the point "c" to the point "d". That is, Tcd is the sum of the time constant $Tx_1$ for the first maximum acceleration, the moving time $Txm_2$ with the first maximum moving speed Fx, and the time constant $Tx_2$ for the first maximum deceleration. On the other hand, Tcd' is the sum of the moving time $Txm_2'$ with the first maximum moving speed Fx and the time constant $Tx_2$ for the first maximum deceleration. Further, from the relationship between the area and the moving distance, $Txm_2' = Txm_2 + Tx_1/2$. From the above, the following equations hold.

$$Tcd = Tx_1 + Txm_2 + Tx_2 \tag{5}$$

$$Tcd' = Txm_2' + Tx_2 = Txm_2 + Tx_1/2 + Tx_2 \tag{6}$$

The moving time Tbc from the point "b" to the point "c" according to the method of the prior art and the moving time Tbc' according to the method of the present invention are equal to each other, as the method for moving the mobile body by the Y-axis driving unit is the same between them. From the above, the equations (1) and (2) can be transformed as follows:

$$T = 2(Tx_1 + Tx_2) + Txm_1 + Tbc + Txm_2 \tag{7}$$

$$T' = 3/2(Tx_1 + Tx_2) + Txm_1 + Tbc' + Txm_2 \tag{8}$$

Hence, the amount of moving time, ΔT, that can be saved along the path from the point "a" to the point "d" by the method of the present invention is given by $$\Delta T = T - T' = (Tx_1 + Tx_2)/2 \tag{9}$$

Figure 4:
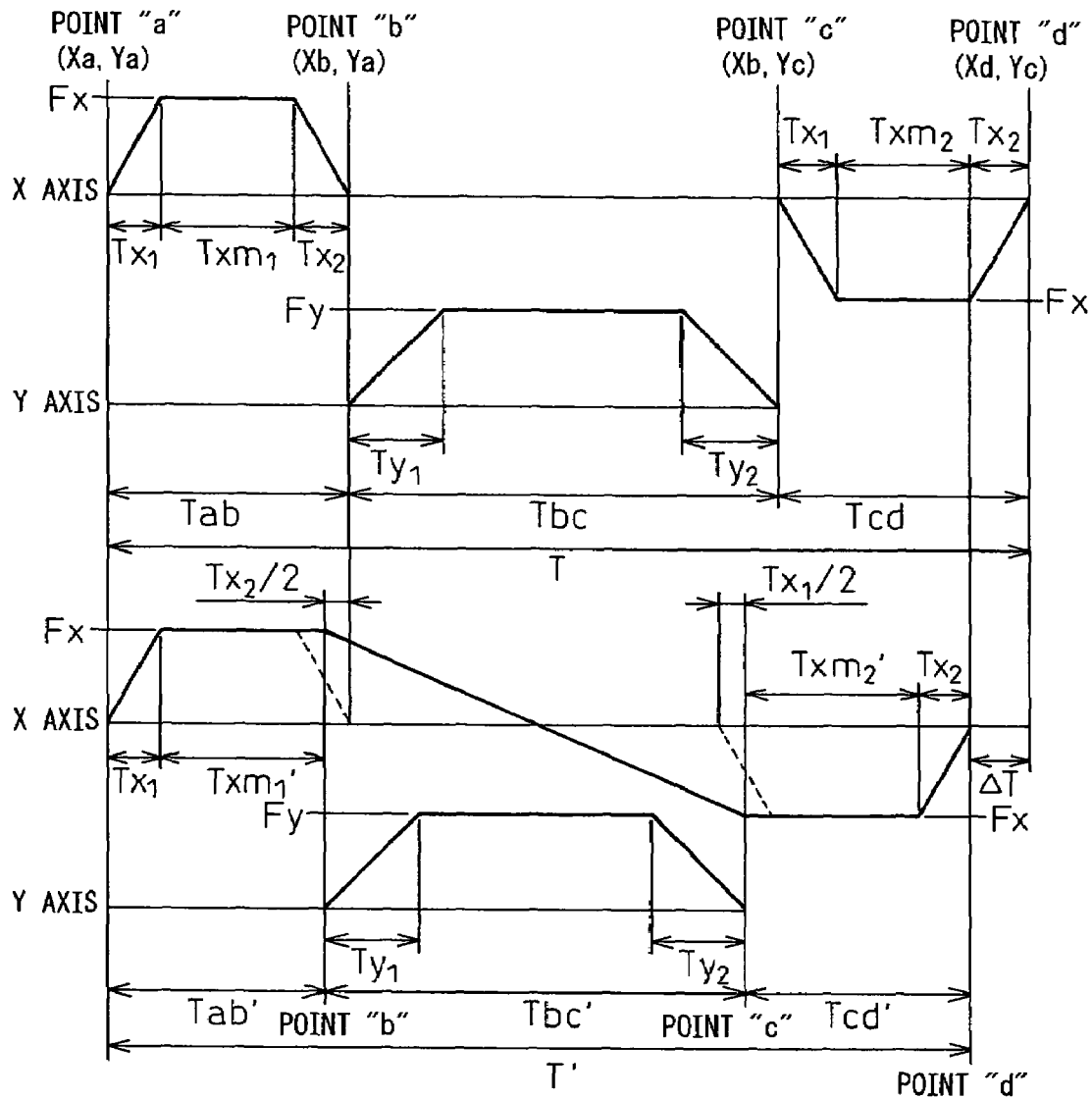
FIG. 4 is a diagram showing FIGS. 19b and 2a arranged along the same time axis for comparison.
Figure 5:
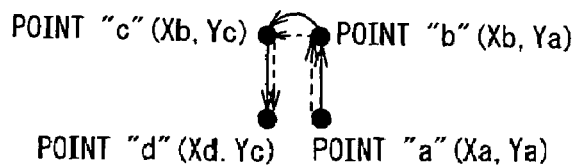
FIG. 5 is a diagram similar to FIG. 2b, except that the distance between points "b" and "c" is shorter than the prescribed distance.

The explanation given with reference to FIG. 4 holds for the case where the points "b" and "c" are separated by a prescribed distance, or more specifically, at least by a distance that satisfies Tbc=(Tx$_1$+Tx$_2$). Accordingly, when the distance between the points "b" and "c" is very small, as shown in FIG. 5, that is, when Tbc<(Tx$_1$+Tx$_2$), the amount of moving time that can be saved is calculated differently than the above case. The method of calculation will be described with reference to FIG. 6.

Figure 6:
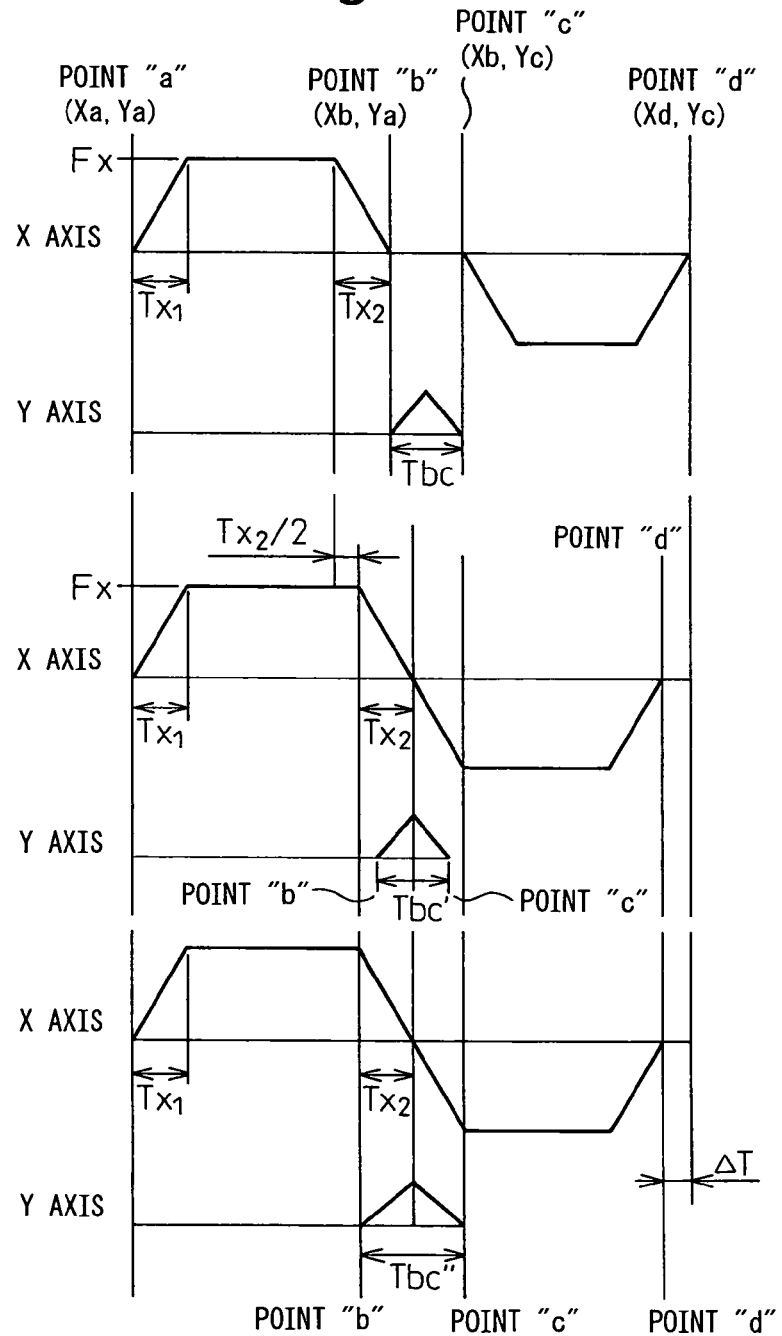
FIG. 6 is a diagram showing in the upper part the change of the driving speed of each axis driving unit when the mobile body moves along dashed lines in FIG. 5 according to a prior art moving method, in the middle part the change of the driving speed of each axis driving unit when the mobile body moves along solid lines in FIG. 5 according to the moving method of the present invention, and in the lower part the case where the driving time of a Y-axis driving unit is extended according to the moving method of the present invention.

FIG. 6 is a diagram showing the relationship between the moving speed and moving time of the mobile body, the upper part for the moving method of the prior art and the middle part for the moving method of the present invention. Based on the same concept as explained with the above equations (1) to (9), the overall moving times T and T' according to the moving method of the prior art and the moving method of the present invention are respectively expressed by the following equations.

$$T=2(Tx_1+Tx_2)+Txm_1+Tbc+Txm_2 \qquad (10)$$

$$T'=5/2(Tx_1+Tx_2)+Txm_1+Txm_2 \qquad (11)$$

The equation (11) differs from the equation (8) in that Tbc' in the equation (8) is replaced by (Tx$_1$+Tx$_2$) since, as can be seen from the middle part of FIG. 6, Tbc'<(Tx$_1$+Tx$_2$). Hence, the amount of moving time, ΔT, that can be saved along the path from the point "a" to the point "d" by the method of the present invention is given by $$\Delta T=T-T'=Tbc-(Tx_1+Tx_2)/2 \qquad (12)$$

From the equation (12), it can be seen that the overall moving time can be shortened when the moving time Tbc from the point "b" to the point "c" is longer than (Tx$_1$+Tx$_2$)/2. That is, when Tbc>(Tx$_1$+Tx$_2$)/2 (if the first assumption of the present embodiment is included, then when (Tx$_1$+Tx$_2$)/2<Tbc<(Tx$_1$+Tx$_2$)), the moving time is shorted by an amount of time equal to Tbc−(Tx$_1$+Tx$_2$)/2.

When Tbc'<(Tx$_1$+Tx$_2$) as in the present embodiment, the overall moving time does not increase if Tbc' is extended to Tbc'' which is equal to (Tx$_1$+Tx$_2$) as shown in the lower part of FIG. 6. In this case, since the Y-axis driving unit can drive the mobile body with an acceleration and deceleration smaller than its maximum acceleration and deceleration, mechanical damage can be reduced.

Figure 7:
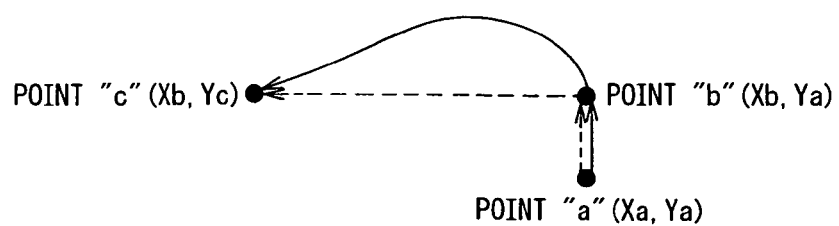
FIG. 7 is a diagram similar to FIG. 5 showing an L-shaped moving path according to the moving method of the present invention for comparison with the prior art moving method.

There are cases where the mobile body of the machine tool should be moved, not in a U-shaped path, but in an L-shaped path as shown by dashed lines in FIG. 7. This corresponds to the case where the point "d" in FIG. 19a is omitted. The moving method according to the present invention for this case will be described with reference to FIG. 8 in conjunction with FIG. 3b which illustrates the detailed operation performed in step 104.

Figure 8:
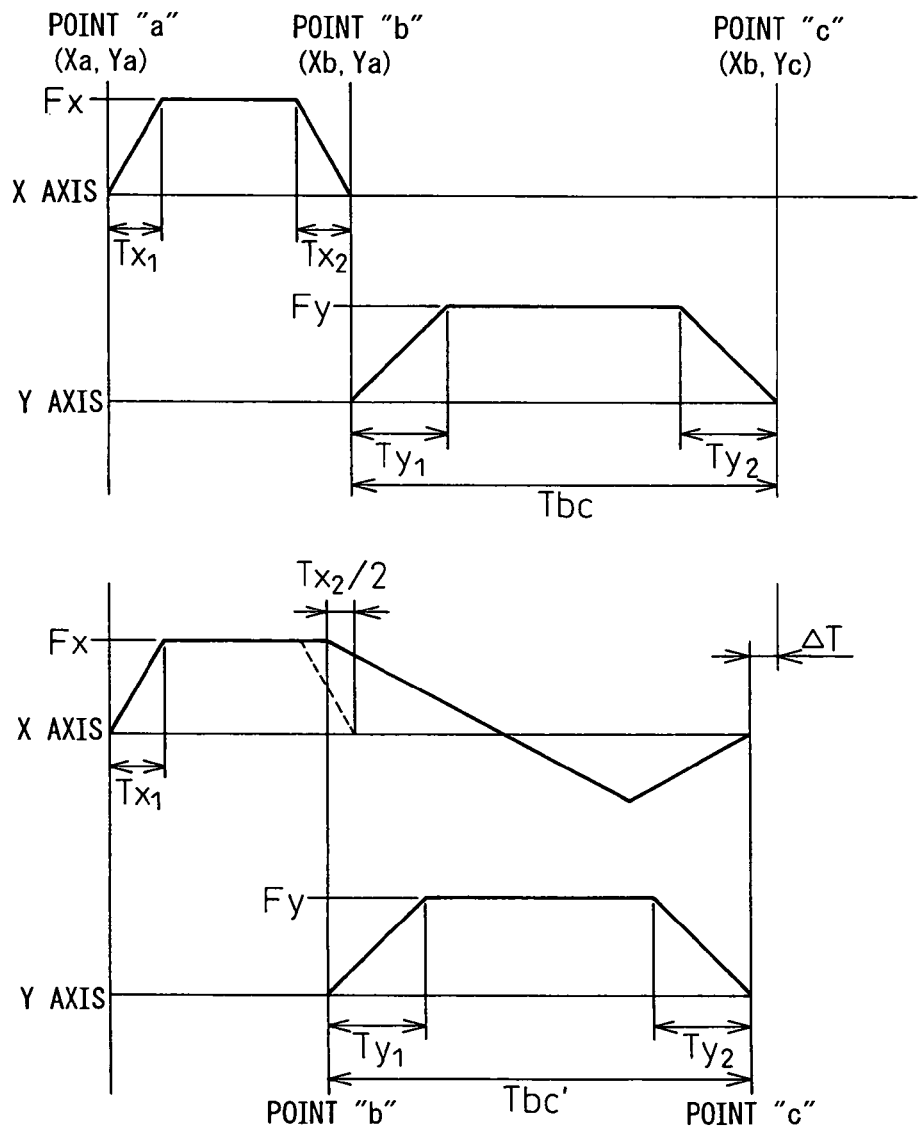
FIG. 8 is a diagram showing the change of the driving speed of each axis driving unit when the mobile body moves along dashed lines in FIG. 7, the upper part for the prior art moving method and the lower part for the moving method of the present invention.

FIG. 8 is a diagram showing the relationship between the moving speed and moving time of the mobile body, the upper part for the moving method of the prior art and the lower part for the moving method of the present invention. The upper part of FIG. 8 is the same as FIG. 19b, except that the movement from the point "c" to the point "d" is omitted. On the other hand, the moving method shown in the lower part of FIG. 8 can be considered the same as that in FIG. 2a up to the time the mobile body passes the point "b". That is, the X-axis driving unit accelerates the mobile body with the first maximum acceleration, and drives the mobile body constantly at the first maximum moving speed until the mobile body reaches the point "b" (step 1041b in FIG. 3b); then, the instant that the mobile body reaches the point "b", the Y-axis driving unit begins to accelerate the mobile body with the second maximum acceleration, and then drives the mobile body constantly at the second maximum moving speed (step 1042b). On the other hand, the X-axis driving unit performs slow acceleration and deceleration during the moving time Tbc, i.e., the time during which the mobile body moves from the point "b" to the point "c". More specifically, the X-axis driving unit is controlled so that immediately after reaching the point "b", the mobile body is slowly decelerated (step 1042b) and, when the moving speed in the X-axis direction becomes zero, the mobile body is slowly accelerated again, this time in the opposite direction (step 1043b), and so that as the mobile body approaches the point "c", the mobile body is slowly decelerated again (step 1044b) and, when the Y-axis driving unit stops (step 1045b) after the time Tbc has elapsed from the point "b", the X coordinate of the mobile body becomes equal to the X coordinate of the point "c". Since, unlike the prior art, the mobile body is not decelerated with the maximum deceleration, i.e., with the minimum time constant, just before reaching the point "b", this moving method can alleviate the mechanical impact or damage.

Next, the amount of moving time that can be saved by the moving method of the present invention will be described. Noting the area in the vicinity of the point "b" in the lower part of FIG. 8, compared with the moving time Tab from the point "a" to the point "b" in the prior art, the moving time Tab' from the point "a" to the point "b" according to the present invention is shorter by an amount of time equal to one half of the time constant Tx$_2$ defining the deceleration, as previously described with reference to FIG. 4 about the area in the vicinity of the point "b". In the case of the L-shaped movement, Tx$_2$/2 directly represents the amount of time by which the overall moving time can be shortened.

According to the moving method shown in the lower part of FIG. 8, the mobile body moves from the point "b" to the point "c" along a curved path as shown by a solid line in FIG. 7.

While the above has described the moving method for the basic movements represented by the U-shaped and L-shaped movements, the following describes examples of applications where the moving method of the present invention can be effectively utilized.

Figure 9:
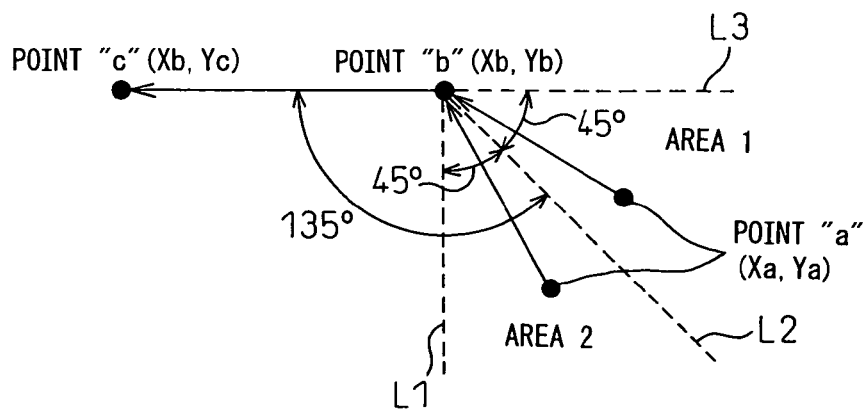
FIG. 9 is a diagram showing an application example of the mobile body moving path to which the moving method of the present invention can be applied, the diagram showing cases that differ according to the movement starting point of the mobile body.

FIG. 9 is a diagram showing an application example concerning the mode of movement of the mobile body to which the moving method according to the present invention can be applied. This example can be considered a modified example of the L-shaped movement described above, and the movement from the point "b" (Xb, Yb) to the point "c" (Xb, Yc) is the same as the corresponding movement in the above L-shaped path, but the difference is that the path extending from the point "a" (Xa, Ya) to the point "b" is not on the half-line L1, that is, the movement from the point "a" to the point "b" is performed using not only the X-axis driving unit but also the Y-axis driving unit at the same time. The following description will be given for two different cases, that is, the case where the point "a" is located in an area 1 bounded by a half-line L2 extending to the point "b" so as to make an angle of 135° with the line segment bc and a straight line L3 extending along the Y-axis direction passing through the point "b", and the case where the point "a" is located in an area 2 bounded by L2 and L1. It is assumed here that the X-axis and Y-axis driving units have substantially the same driving capability.

First, referring to FIG. 10b in conjunction with FIG. 3c which illustrates the detailed operation performed in step 104, a description will be given of the case where the point "a" is located in the area 1 as shown by a dashed line in FIG. 10a. The upper part of FIG. 10b shows the relationship between the moving speed and moving time according to the prior art moving method. In this case, both of the axis driving units begin to operate simultaneously. Here, since the distance that the mobile body travels from the point "a" to the point "b" is longer along the Y axis, the acceleration and deceleration of the X-axis driving unit can be decreased (that is, the time constants can be increased to $Tx_1'$ and $Tx_2'$, respectively) to match the moving time Tab of the Y-axis driving unit, as shown in the figure. Next, the axis driving units both stop at the point "b", after which only the Y-axis driving unit is put into operation and accelerates the mobile body with the second maximum acceleration; after driving the mobile body constantly at the second maximum moving speed for a predetermined length of time, the Y-axis driving unit decelerates the mobile body with the second maximum deceleration until it comes to a stop.

The lower part of FIG. 10b shows the relationship between the moving speed and moving time according to the moving method of the present invention, as contrasted with the upper part of FIG. 10b. First, both of the axis driving units begin to operate simultaneously (step 1041c in FIG. 3c). The Y-axis driving unit accelerates the mobile body with the second maximum acceleration and drives it constantly at the second maximum moving speed, but the difference from the prior art method is that the mobile body is not decelerated just before the point "b" but is moved past the point "b" while maintaining the second maximum moving speed in the Y-axis direction. In this case, based on the same concept explained in the case of the previously described U-shaped movement, the moving time Tab' from the point "a" to the point "b" becomes shorter than the moving time Tab from the point "a" to the point "b" in the prior art moving method by an amount of time equal to one half of the minimum time constant $Ty_2$ defining the deceleration of the Y-axis driving unit. Likewise, the moving time Tbc' from the point "b" to the point "c" becomes shorter than the moving time Tbc from the point "b" to the point "c" in the prior art moving method by an amount of time equal to one half of the minimum time constant $Ty_1$ defining the acceleration of the Y-axis driving unit. As a result, the overall moving time T' from the point "a" to the point "c" in the moving method according to the present invention becomes shorter than the overall moving time T from the point "a" to the point "c" in the prior art moving method by an amount of time equal to $(Ty_1+Ty_2)/2$.

The driving control section, on the other hand, controls the X-axis driving unit during the movement from the point "a" to the point "b" so that when the Y coordinate of the mobile body becomes equal to Yb, the X coordinate of the mobile body becomes equal to Xb and the moving speed in the X-axis direction is not zero, as shown in the lower part of FIG. 10b. If this condition is satisfied, the time constant for the acceleration from the point "a" may be set to $Tx_1''$ which is larger than $Tx_1'$, and the moving speed in the X-axis direction at the point "b" may be set to $Fx_1$ which is slower than the first maximum moving speed Fx. Then, the driving control section controls the X-axis driving unit so that immediately after reaching the point "b", the mobile body is slowly decelerated (step 1042c) and, when the moving speed in the X-axis direction becomes zero, the mobile body is slowly accelerated again, this time in the opposite direction (step 1043c), and so that as the mobile body approaches the point "c", the mobile body is slowly decelerated again (step 1044c) and, when the Y-axis driving unit stops (step 1045c) after the time Tbc' has elapsed from the point "b", the X coordinate of the mobile body becomes equal to the X coordinate of the point "c". According to this moving method, the X-axis driving unit need not accelerate or decelerate the mobile body with its minimum time constant in any segment of the path from the point "a" to the point "c". However, when the moving distance in the X-axis direction from the point "a" to the point "b" is extremely short compared with the moving distance in the Y-axis direction, and when there is no need to drive the mobile body with such a large acceleration and deceleration that can cause a mechanical impact if the X-axis driving unit is operated only for the movement from the point "a" to the point "b" as in the prior art, then control may be performed so that the X-axis driving unit is operated only for the movement from the point "a" to the point "b". According to the moving method shown in the lower part of FIG. 10b, the mobile body moves from the point "b" to the point "c" along a curved path as shown by a solid line in FIG. 10a.

Next, the relationship between the moving speed and moving time according to the prior art moving method is shown in the upper part of FIG. 11b for the case where the point "a" is located in the area 2 as shown by a dashed line in FIG. 11a. In this case also, both of the axis driving units begin to operate simultaneously. Here, as the distance that the mobile body travels from the point "a" to the point "b" is longer along the X axis, which is opposite to the case of FIG. 10a, the acceleration and deceleration of the Y-axis driving unit can be decreased (that is, the time constants can be increased to $Ty_1'$ and $Ty_2'$, respectively) to match the moving time Tab of the X-axis driving unit, as shown in the figure. Next, the axis driving units both stop at the point "b", after which only the Y-axis driving unit is put into operation and accelerates the mobile body with the second maximum acceleration; after driving the mobile body constantly at the second maximum moving speed for a predetermined length of time, the Y-axis driving unit decelerates the mobile body with the second maximum deceleration until it comes to a stop.

The lower part of FIG. 11b shows the relationship between the moving speed and moving time according to the moving method of the present invention, as contrasted with the upper part of FIG. 11b. The step numbers are not given here as they are the same as those in FIG. 3c. First, both of the axis driving units begin to operate simultaneously. The X-axis driving unit accelerates the mobile body with the first maximum acceleration and drives it constantly at the first maximum moving speed, but the difference from the prior art method is that the mobile body is not decelerated just before the point "b" but is moved past the point "b" while maintaining its maximum moving speed. In this case, based on the same concept explained for the U-shaped movement, the moving time Tab' from the point "a" to the point "b" becomes shorter than the moving time Tab from the point "aa" to the point "b" in the prior art moving method by an amount of time equal to one half of the minimum time constant $Tx_2$ defining the deceleration of the X-axis driving unit. The driving control section, on the other hand, controls the Y-axis driving unit so that when the X coordinate of the mobile body becomes equal to Xb, the Y coordinate of the mobile body becomes equal to Yb and the moving speed in the Y-axis direction is not zero, as shown in the lower part of FIG. 11b. Accordingly, the time constant for the acceleration from the point "a" may be set to $Ty_1''$ which is smaller than $Ty_1'$. Further, the moving speed in the Y-axis direction at the point "b" may be set equal to the second maximum moving speed Fy or to $Fy_1$ which is slower than Fy, but the second maximum moving speed is preferable from the viewpoint of moving time. Here, if the moving speed of the mobile body in the Y-axis direction has been set so as to reach the second maximum moving speed Fy at the point "b" (though not shown here), the earlier described principle can be applied here, and the moving time Tbc' from the point "b" to the point "c" becomes shorter than the moving time Tbc from the point "b" to the point "c" in the prior art moving method by an amount of time equal to one half of the minimum time constant $Ty_1$ defining the acceleration of the Y-axis driving unit. As a result, the overall moving time T' from the point "a" to the point "c" becomes shorter than the overall moving time T from the point "a" to the point "c" in the prior art moving method by an amount of time equal to $(Tx_2+Ty_1)/2$. On the other hand, if the moving speed of the mobile body in the Y-axis direction has been set so as not to reach the second maximum moving speed at the point "b" (as shown in the lower part of FIG. 11b), the mobile body after passing the point "b" is further accelerated in the Y-axis direction in order to shorten the moving time; accordingly, compared with the case where the moving speed has been set so as to reach the second maximum moving speed at the point "b", the moving time increases by an amount of time equal to the area size of the shaded area in the lower part of FIG. 11b divided by the second maximum moving speed Fy.

As described above, with the moving method of the present invention, the moving time can be shortened while, at the same time, reducing the mechanical impact caused by the maximum acceleration and deceleration. It should also be noted that by utilizing the moving time thus saved, the mechanical impact or damage can be further reduced. The method for accomplishing this will be explained below.

Figure 12:
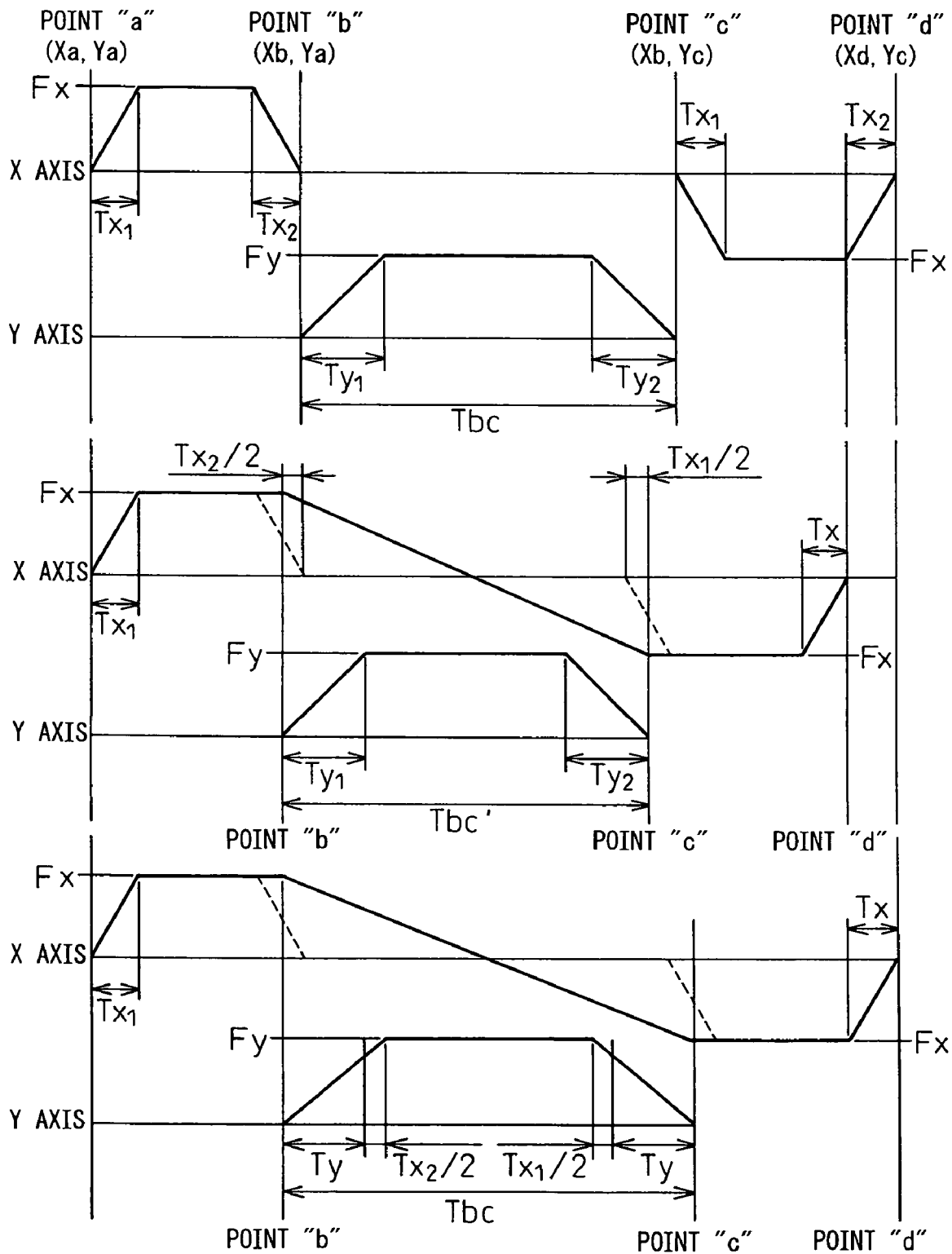
FIG. 12 is a diagram showing in the upper part a diagram similar to FIG. 19b, in the middle part a diagram similar to FIG. 2a, and in the lower part a diagram showing the case where the moving time that can be saved in FIG. 2a is used to extend the driving time of the Y-axis driving unit.

FIG. 12 is a diagram for explaining the method for further reducing the mechanical impact in the U-shaped movement shown in FIG. 2b. Here, FIGS. 19b and 2a are redrawn in the upper and middle parts of FIG. 12. The moving method shown in the lower part of FIG. 12 is similar to that shown in the middle part of FIG. 12, but the overall moving time is equal to that in the prior art moving method. That is, the moving time Tbc" from the point "b" to the point "c" in the lower part of FIG. 12 is longer than the moving time Tbc' (=Tbc) from the point "b" to the point "c" in the middle part of FIG. 12 by the moving time $(Tx_1+Tx_2)/2$ that has been saved by the moving method of the present invention. As a result, in the moving method shown in the lower part of FIG. 12, the Y-axis driving unit also need not be operated to accelerate and decelerate the mobile body with its maximum acceleration and deceleration, that is, the sum of the two time constants for the acceleration and deceleration can be increased by $(Tx_1+Tx_2)/2$. More specifically, the acceleration and deceleration time constants may be increased by $Tx_2/2$ and $Tx_1/2$, respectively, as shown in the figure, or each may be increased by $(Tx_1+Tx_2)/4$, or only one of them may be increased by $(Tx_1+Tx_2)/2$; alternatively, both may be increased by appropriate proportions. In any case, at least either the acceleration or the deceleration is performed with a time constant longer than its minimum time constant, and this serves to alleviate the mechanical impact.

Though not shown here, the moving time $(Tx_1+Tx_2)/2$ that can be saved may be used for the purpose of increasing the time constants that define the acceleration and deceleration in the X-axis direction at the points "a" and "d". In this way, in such cases as when the moving time need not necessarily be shortened compared with the prior art, or when alleviation of the mechanical impact has precedence over the reduction of the moving time, the moving time that can be saved can be effectively utilized to increase the acceleration and deceleration time constants that can greatly affect the mechanical impact.

The application example of the present invention hereinafter described concerns the mode of movement in which operations corresponding to the above-described U-shaped movement are performed repeatedly, and is applicable, in particular, to screw-thread cutting. In this example, however, rather than moving only the mobile body, both the tool and the workpiece as the first and second mobile bodies, respectively, are moved relative to each other, thereby moving the tool in a U-shaped path relative to the workpiece.

Figure 20:
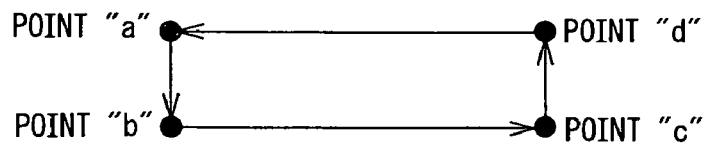
FIG. 20 is a diagram showing the moving path of the tool relative to the workpiece during screw threading according to the prior art.

FIGS. 13a to 13d are schematic diagrams showing a portion of a machine tool that performs screw-thread cutting. The workpiece 60 is held in a suitable chuck, not shown, and is movable in left and right direction in the plane of the figure, i.e., in the Z-axis direction, relative to a guide bush 62. On the other hand, the tool 64 is held in a tool holder not shown, and is movable in up and down directions in the plane of the figure, i.e., in the X-axis direction. FIGS. 14 and 20 are diagrams similar to FIGS. 2b and 19a, respectively, and show the moving path of the tool 64 relative to the workpiece 60 for the case of the present invention and the case of the prior art, respectively.

First, the prior art machining method will be described with reference to FIGS. 13a to 13d and FIG. 20. Here, FIGS. 13a to 13d are common to both the prior art and the present invention. FIG. 13a shows the condition before machining, and the tool 64 is located in its standby position. This condition corresponds to the case where the tool 64 is positioned at the point "a" in FIG. 20. Next, as shown in FIG. 13b, the tool 64 moves along the X axis and stops at the machining start point which corresponds to the point "b" in FIG. 20. Then, as shown in FIG. 13c, immediately after the tool 64 stops, the workpiece 60 moves along the Z axis toward the tool 64 which performs thread cutting. At this time, the tool 64 does not move, but since the workpiece 60 moves, the tool 64 relatively moves toward the point "c" in FIG. 20. When the tool 64 reaches the point "c", the movement of the workpiece 60 stops, whereupon the tool 64 moves back to the standby position and stops. This condition corresponds to the point "d" in FIG. 20. Finally, immediately after the tool 64 stops, the workpiece is moved back to its initial position and stops, thus returning to the condition of FIG. 13a. Usually, the thread cutting is performed by repeating the cycle of FIGS. 13a to 13d a plurality of times to form a screw of a prescribed size. From the above, it can be said that the moving path shown in FIG. 20 is a rectangular moving path formed by adding the relative movement during the threading (the movement from the point "b" to the point "c" in FIG. 20) to the U-shaped moving path shown in FIG. 19a.

Figure 15:
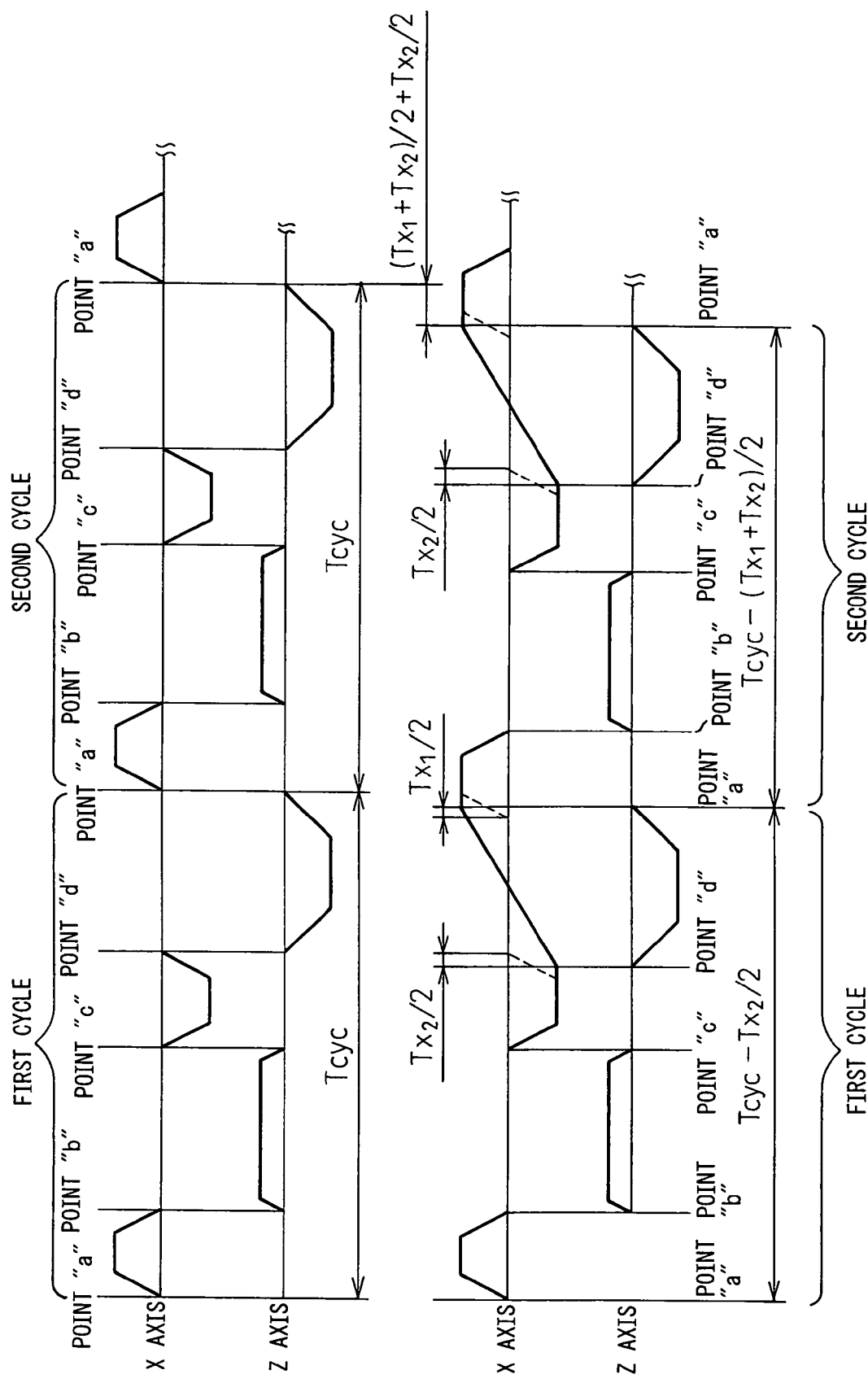
FIG. 15 is a diagram showing the change of the driving speed of each axis driving unit for the first two cycles when the tool relatively moves along the moving path, the upper part showing the case for the moving path of FIG. 20 and the lower part for the moving path of FIG. 14.
Figure 16:
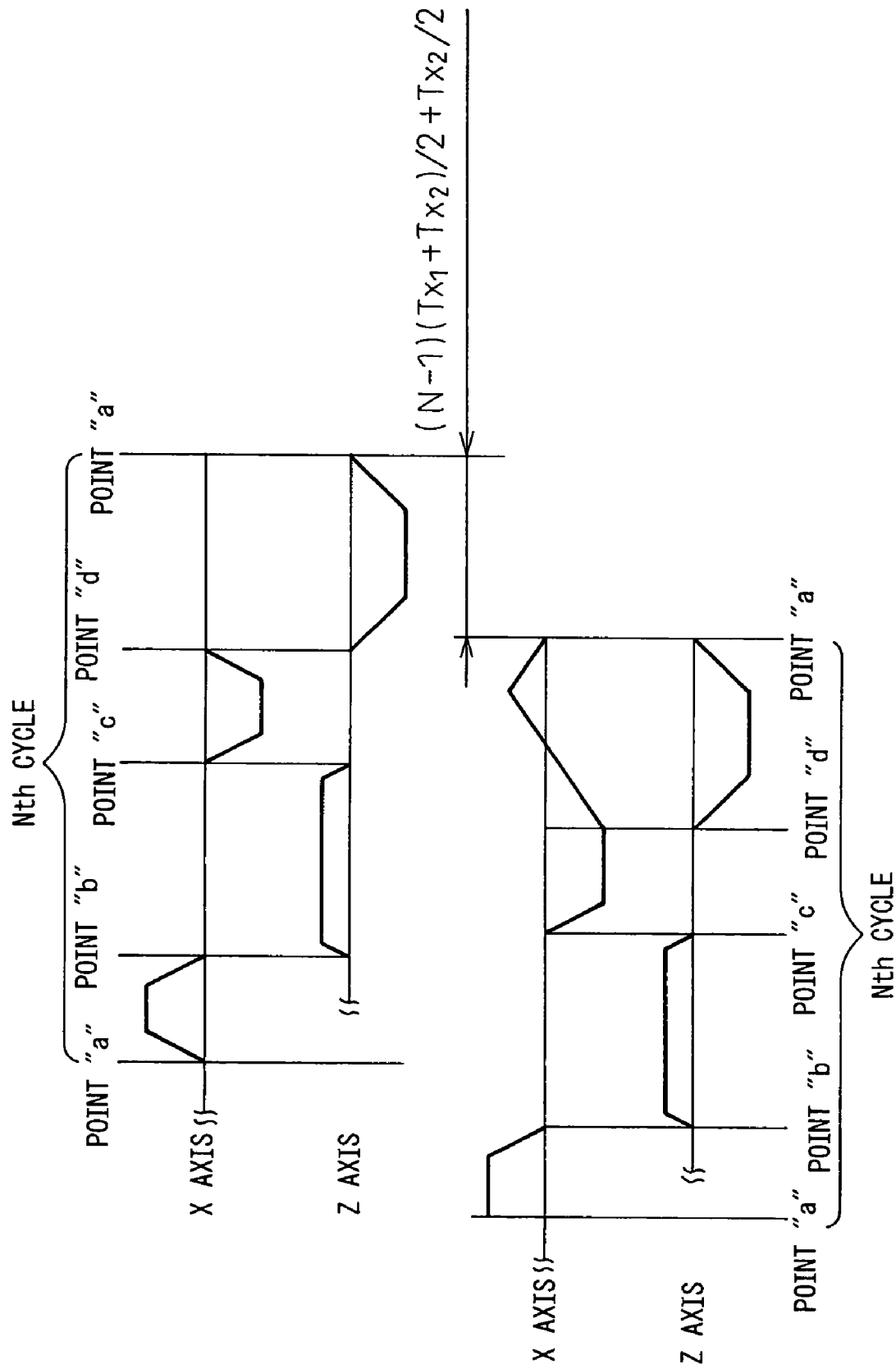
FIG. 16 is a diagram showing the change of the driving speed of each axis driving unit for the final cycle when the tool relatively moves along the moving path, the upper part showing the case for the moving path of FIG. 20 and the lower part for the moving path of FIG. 14.

The upper part of FIG. 15 and the upper part of FIG. 16 are diagrams each similar to FIG. 19b, and show how the driving speeds of the tool and the workpiece change when the tool relatively moves along the moving path shown in FIG. 20: FIG. 15 shows the first two cycles, and FIG. 16 shows the final cycle. The time required to complete one thread cutting cycle, i.e., the length of time required for the relative movement of the tool starting from the point "a" and returning to the point "a", is the sum of the moving time of the tool from the point "a" to the point "b" and from the point "c" to the point "d" and the moving time of the workpiece from the point "b" to the point "c" and from the point "d" to the point "a", and the time required to complete the series of thread cutting operations is equal to the time required to complete one thread cutting cycle multiplied by the number of times the cycle is repeated. Accordingly, when the time required to complete one thread cutting cycle is denoted by Tcyc, and the number of cycles by N, then the time required to complete the series of thread cutting operations according to the prior art is given by N·Tcyc.

Next, the machining method according to the present invention will be described with reference to FIGS. 13a to 13d and FIG. 14. FIG. 13a shows the condition before machining, and the tool 64 is located in its standby position. This condition corresponds to the case where the tool 64 is positioned at the point "a" in FIG. 14. Next, as shown in FIG. 13b, the tool 64 moves along the X axis and stops at the machining start point which corresponds to the point "b" in FIG. 14. Then, as shown in FIG. 13c, immediately after the tool 64 stops, the workpiece 60 moves along the Z axis toward the tool 64 which performs thread cutting. At this time, the tool 64 does not move, but since the workpiece 60 moves, the tool 64 relatively moves toward the point "c" in FIG. 14. When the tool 64 reaches the point "c", the movement of the workpiece 60 stops. The mode of movement up to this point is the same as that of the prior art shown in FIG. 20.

The mode of movement starting from the point "c" is substantially the same as that described with reference to FIG. 2b. That is, the tool 64 moves along the X-axis direction at the maximum speed until it reaches the point "d" and, when the tool 64 reaches the point "d", the workpiece 60 is immediately moved in the Z-axis direction. The tool 64 after reaching the point "d" is slowly decelerated and, when the relative position of the tool 64 reaches the midpoint between the point "d" and the point "a" as measured in terms of Z coordinates, the moving speed in the X-axis direction temporarily becomes zero, and then slowly increases again, this time in the opposite direction. This slow deceleration and reacceleration are controlled so that the moving speed in the X-axis direction becomes maximum when the relative position of the tool 64 reaches the point "a" as a result of the movement of the workpiece 60. From the point "a", the process proceeds to the next thread cutting cycle, and the above operation is repeated a prescribed number of times. It can therefore be said that the moving path shown in FIG. 14 is a rectangular moving path formed by adding the relative movement during the threading (the movement from the point "b" to the point "c" in FIG. 14) to the U-shaped moving path shown in FIG. 2b.

However, since the series of thread cutting operations ends when the tool 64 stops at the point "a" in FIG. 14, the mode of movement in the final thread cutting cycle according to the present invention corresponds the L-shaped mode of movement shown in FIG. 7 and the lower part of FIG. 8. That is, immediately after reaching the point "d", the tool 64 is slowly decelerated; on the other hand, when the tool 64 reaches the point "d", the workpiece 60 is immediately moved in the Z-axis direction. When the moving speed in the X-axis direction becomes zero during the movement of the workpiece 60, the tool 64 is slowly accelerated again, this time in the opposite direction; here, the tool 64 is controlled so that as it approaches the point "a", it is slowly decelerated again and, when the movement of the workpiece 60 ends, the tool 64 stops at the relative position "a".

The lower part of FIG. 15 and the lower part of FIG. 16 are diagrams showing how the driving speeds of the tool and the workpiece change when the tool relatively moves along the moving path shown in FIG. 14: FIG. 15 shows the first two cycles, and FIG. 16 shows the final cycle. Based on the same principle as explained with reference to FIG. 4, the thread cutting time according to the present embodiment, compared with the prior art, is shortened by an amount of time equal to the time constant $Tx_2$ for the first maximum deceleration when passing the point "d" and by an amount of time equal to the time constant $Tx_1$ for the first maximum acceleration when passing the point "a". That is, the thread cutting time according to the present invention can be shortened to $Tcyc-Tx_2/2$ in the first cycle, and to $Tcyc-(Tx_1+Tx_2)/2$ in each of the second to Nth cycles, where N is the total number of cycles. Accordingly, the total amount of time that can be saved during the series of thread cutting operations is given by $(N-1)(Tx_1+Tx_2)/2+Tx_2/2$. When repeating the U-shaped movement a plurality of times, as in the present embodiment, a relatively large amount of time can be saved as a whole.

The general flow of the moving method according to the present invention such as shown in FIG. 1 can also be applied here. However, in the case of the present embodiment, the coordinates of the points "a" to "d" represent the relative coordinates, that is, the position coordinates of the tool, i.e., the mobile body, relative to the workpiece.

Figure 17:
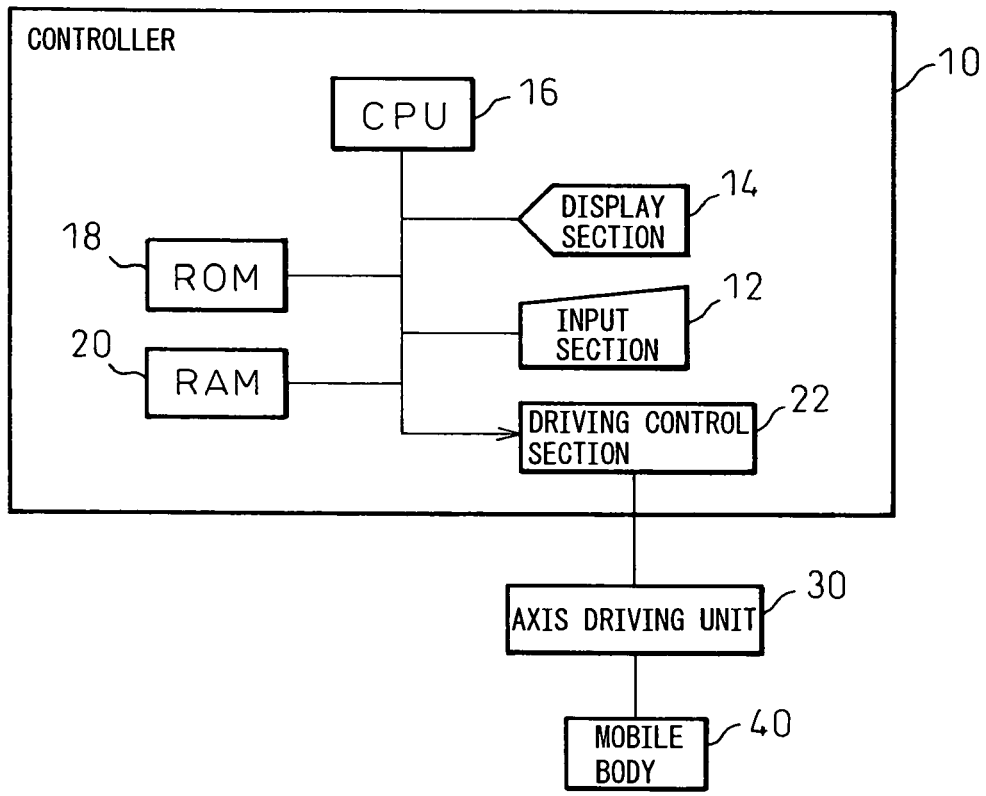
FIG. 17 is a block diagram showing a preferred configuration example of a controller for implementing the moving method of the present invention.
Figure 18:
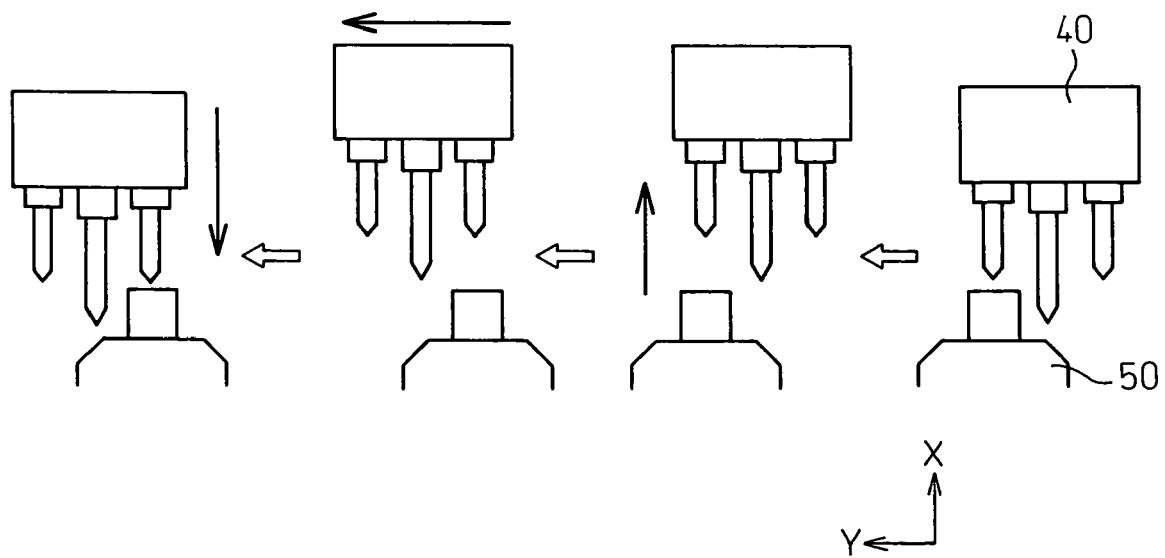
FIG. 18 is a schematic diagram showing one example of the mode of movement of the mobile body in a machine tool according to the prior art.

FIG. 17 is a diagram showing the basic configuration of a movement controller 10 for controlling the movement of a mobile body of a machine tool according to the present invention. The controller 10 is, for example, an NC unit mounted in a numerically controlled (NC) lathe, but the present invention is not limited to this type of controller, but is also applicable to other types of controller than the NC unit. As shown in FIG. 17, the controller 10 may include an input section 12, a display section 14, a processing section (CPU) 16, a storage section (ROM 18 and RAM 20), and a driving control section 22. The input section 12 includes, for example, a keyboard with a numeric pad (not shown), and an operator can enter data necessary for controlling the operation of a first mobile body such as a tool post of the machine tool and the operation of a second mobile body such as a workpiece (the data includes the start and end positions of the mobile bodies, etc., the kind of tool to be selected, and shapes, dimensions, etc.) and also enter a machining program containing these pieces of data for each tool. The display section 14 includes a display apparatus such as a CRT or a liquid crystal display (not shown), and displays the data and machining program entered via the input section 12 and allows interactive programming on the screen of the display apparatus.

The ROM 18 which forms part of the storage section permanently stores control programs for moving the mobile bodies. A storage area for storing various data concerning the moving functions of the mobile bodies, etc., such as the maximum moving speed and the maximum acceleration and deceleration of each driving unit, may be provided in the ROM 18 or the RAM 20. Further, tool data, etc. entered from the input section 12 can be stored in the ROM 18 or the RAM 20 under instruction from the CPU 16. The CPU 16 includes: a direction change point setting section which, based on specified first and second positions, sets a direction change point within a rectangular coordinate system at a position spaced away from a straight line joining the first and second positions; an acceleration/deceleration computing section which computes, as values smaller than a first maximum acceleration and a first minimum deceleration, the acceleration and deceleration with which a mobile body 40 is accelerated and decelerated along the X-axis during a period starting from the time that the mobile body passes the direction change point set by the direction change point setting section until the time that the mobile body reaches the next direction change point or a stopping point; and a mode-of-movement computing section which, based on the acceleration and deceleration computed by the acceleration/deceleration computing section and on a second maximum acceleration and a second maximum deceleration stored in the ROM 18 or the RAM 20, computes the mode of movement of the mobile body 40 so that the movement of the mobile body 40 along the Y axis is completed while the mobile body 40 is being accelerated and decelerated along the X axis. Further, the CPU 16 sends an operation instruction to the driving control section 22 to move the mobile body 40 based on the program or data stored in the ROM 18 or the RAM 20. The driving control section 22 moves the mobile body 40 from the first position to the second position via the direction change point by controlling the movement of the mobile body 40 along the X axis and the movement of the mobile body 40 along the Y axis in accordance with the mode of movement computed by the mode-of-movement computing section in the CPU 16.

Referring back to FIG. 1, first the operator enters the first and second positions, i.e., the coordinates of the movement starting point "a" and end point "d" (or "c") of the mobile body (step 101). Next, based on the first and second positions and the dimensions, etc. of the mobile body prestored in the ROM or the RAM, the processing section of the controller, i.e., the CPU, sets the coordinates of the direction change points "b" and "c" (or the direction change point "b") through which the mobile body should pass during movement (step 102). Next, the CPU selects the driving pattern of each axis driving unit and computes its driving time (step 103). Next, the driving control section of the controller controls the axis driving units so that each axis driving unit operates in accordance with the thus determined driving pattern and driving time (step 104).

As described above, the present invention is characterized in that when the mobile body of the machine tool needs to change direction at least at one position while it is being moved by two-axis control, one of the driving units slowly accelerates and decelerates the mobile body with an acceleration and deceleration smaller than its maximum acceleration and deceleration after the mobile body has reached the direction turning point, and the slow acceleration and deceleration is performed continuously over a part or the entire length of the time during which the other driving unit is driven after the direction change point is reached. Such a moving method can be applied to the case where the mobile body has to pass through a prescribed direction change point in order to avoid interference with other members, but is allowed to move beyond the direction change point by a certain distance in the direction opposite the movement starting point or end point. As the mobile body moves without once stopping at the direction change point, as described above, the movement need not be performed with maximum acceleration and deceleration that can greatly affect the service life, etc. of parts, but the movement can be accomplished with slow acceleration and deceleration that can reduce the impact and, at the same time, the overall moving time can be shortened. Furthermore, as the moving path of the mobile body always passes through the predetermined direction change point, the present invention reliably prevents the mobile body from interfering with other members, unlike the case where the U-shaped moving path of the prior art is simply replaced by a combination of arcuate lines or an arcuate line and straight lines.

According to the present invention, the mobile body can be moved without stopping at any points other than the movement starting point and end point. This serves to reduce the number of times that the mobile body is stopped and restarted with large acceleration and deceleration; as a result, the mobile body can be moved with slow acceleration and deceleration that can alleviate the mechanical impact applied to the mobile body driving units and their component members, while at the same time achieving a reduction in the moving time. Furthermore, in the machine tool equipped with this movement controller, not only can high-precision machining be accomplished by suppressing the vibration of the entire machine during the machining of workpieces, but also the service life of the machine tool can be extended by reducing the mechanical impact applied to the mobile body driving units and their component members.

As described above, according to the moving method of the present invention, the mobile body can be moved smoothly along the moving path containing a curved line or an arcuate line at least in a portion thereof. The embodiment described hereinafter by referring to FIGS. 21 to 25 takes advantage of the benefit offered by the above moving method.

Figure 21:
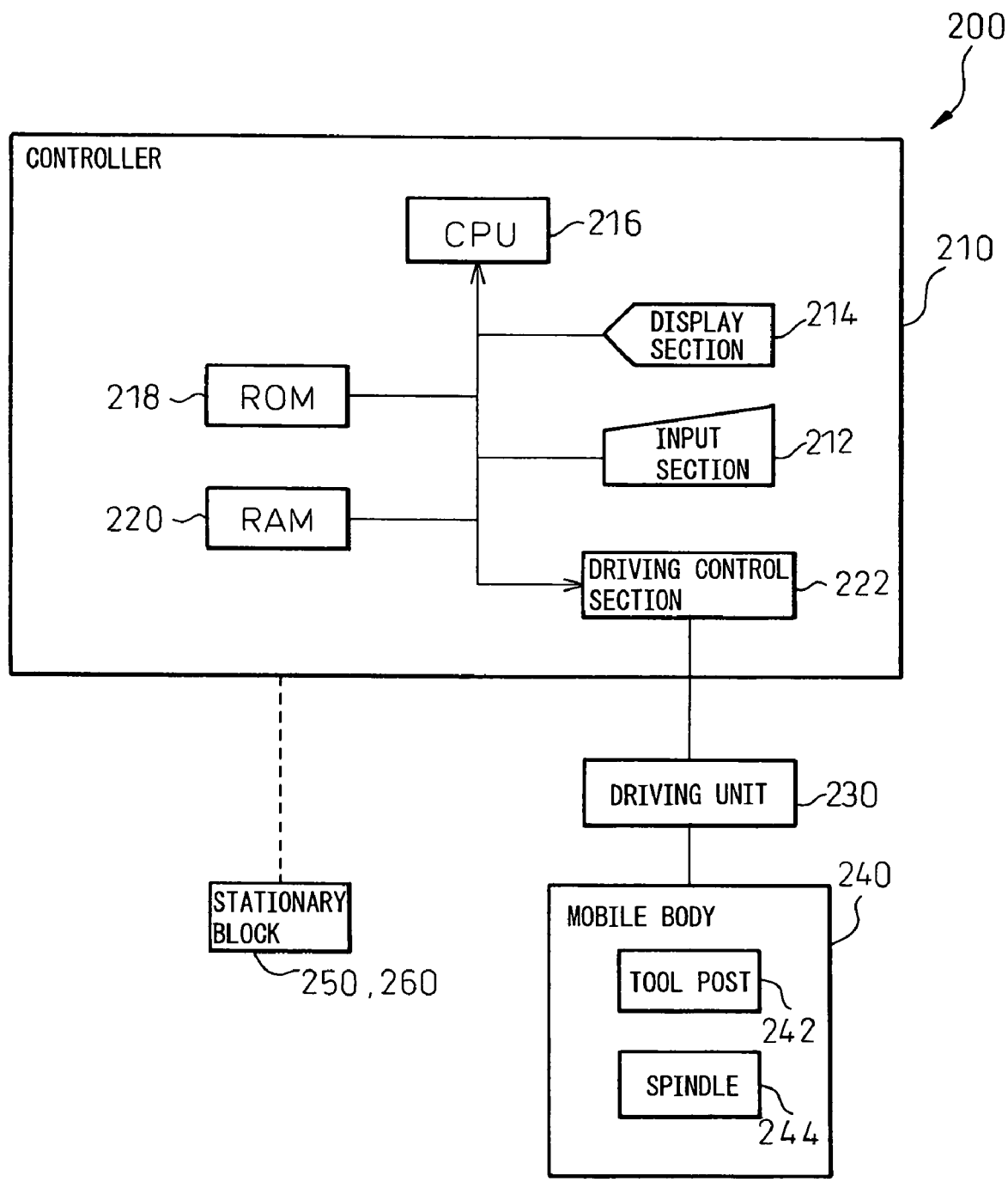
FIG. 21 is a block diagram showing the configuration of a machine tool which includes the controller of the present invention.

FIG. 21 is a schematic diagram similar to FIG. 17 and showing the major components of a machine tool according to a preferred embodiment of the present invention. The machine tool 200 is, for example, an automatic machine tool such as an NC lathe, and includes a mobile body 240, stationary blocks 250 and 260, a driving unit 230 for moving the mobile body, and a controller 210 for controlling the driving unit 230. The mobile body 240, which includes, for example, a tool post 242 and a spindle 244, can be moved by the driving unit 230 to a position near the stationary block 250 or 260 and can, at that position, machine or receive the workpiece held on the stationary block. The controller 210 controls the operation of the driving unit 230.

The controller 210 is, for example, an NC unit mounted in a numerically controlled (NC) lathe, but the present invention is not limited to this type of controller, but is also applicable to types of controller other than the NC unit. As shown in FIG. 21, the controller 210 may include an input section 212, a display section 214, a processing section (CPU) 216, a storage section (ROM 218 and RAM 220), and a driving control section 222. The input section 212 includes, for example, a keyboard with a numeric pad (not shown), and is used to enter data (tool selection, shape and dimensions of workpiece, and machining conditions such as spindle speed and tool feed speed) necessary for controlling the operation of the mobile body such as the tool post, spindle, etc. of the machine tool, and also to enter a machining program containing these pieces of data for each tool. The display section 214 includes a display apparatus such as a CRT or a liquid crystal display (not shown), and displays the data and machining program entered via the input section 212 and allows interactive programming on the screen of the display apparatus.

The ROM 218 which forms part of the storage section permanently stores control programs for moving the mobile body. A storage area for storing various data concerning the mobile body moving functions may be provided in the RAM 220. Further, tool data, etc. entered from the input section 212 is stored in the ROM 218 or the RAM 220 under instruction from the CPU 216. The CPU 216 sends an operation instruction to the driving control section 222 to move the mobile body based on the program or data stored in the ROM 218 or the RAM 220. In accordance with the instruction from the CPU 216, the driving control section 222 moves the mobile body 240 by controlling the driving unit 230 which includes driving sources such as X-axis, Y-axis, and Z-axis driving sources.

Figure 22:
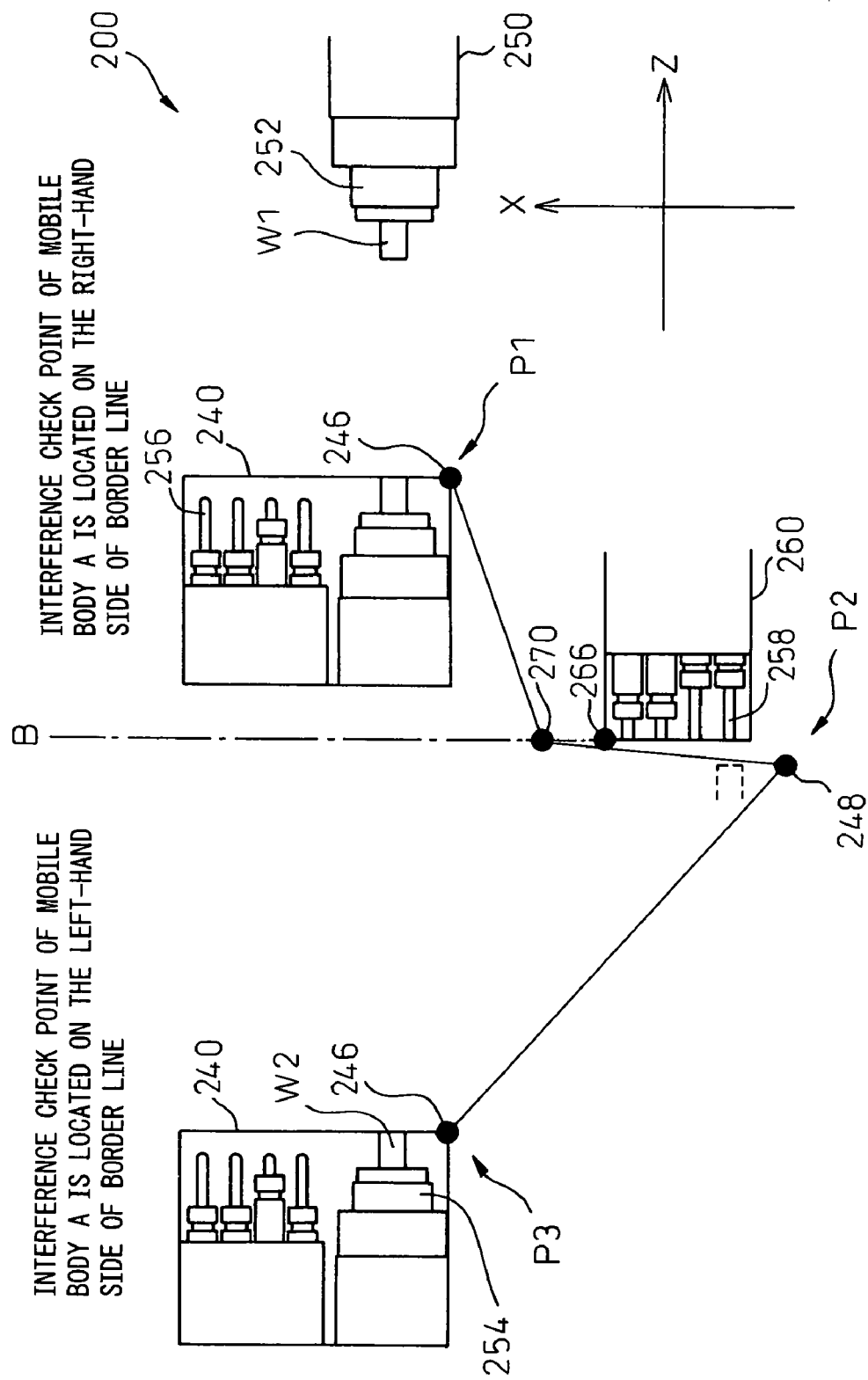
FIG. 22 is a diagram showing how the mobile body can be prevented from interfering with other members by setting a relay point.
Figure 23:
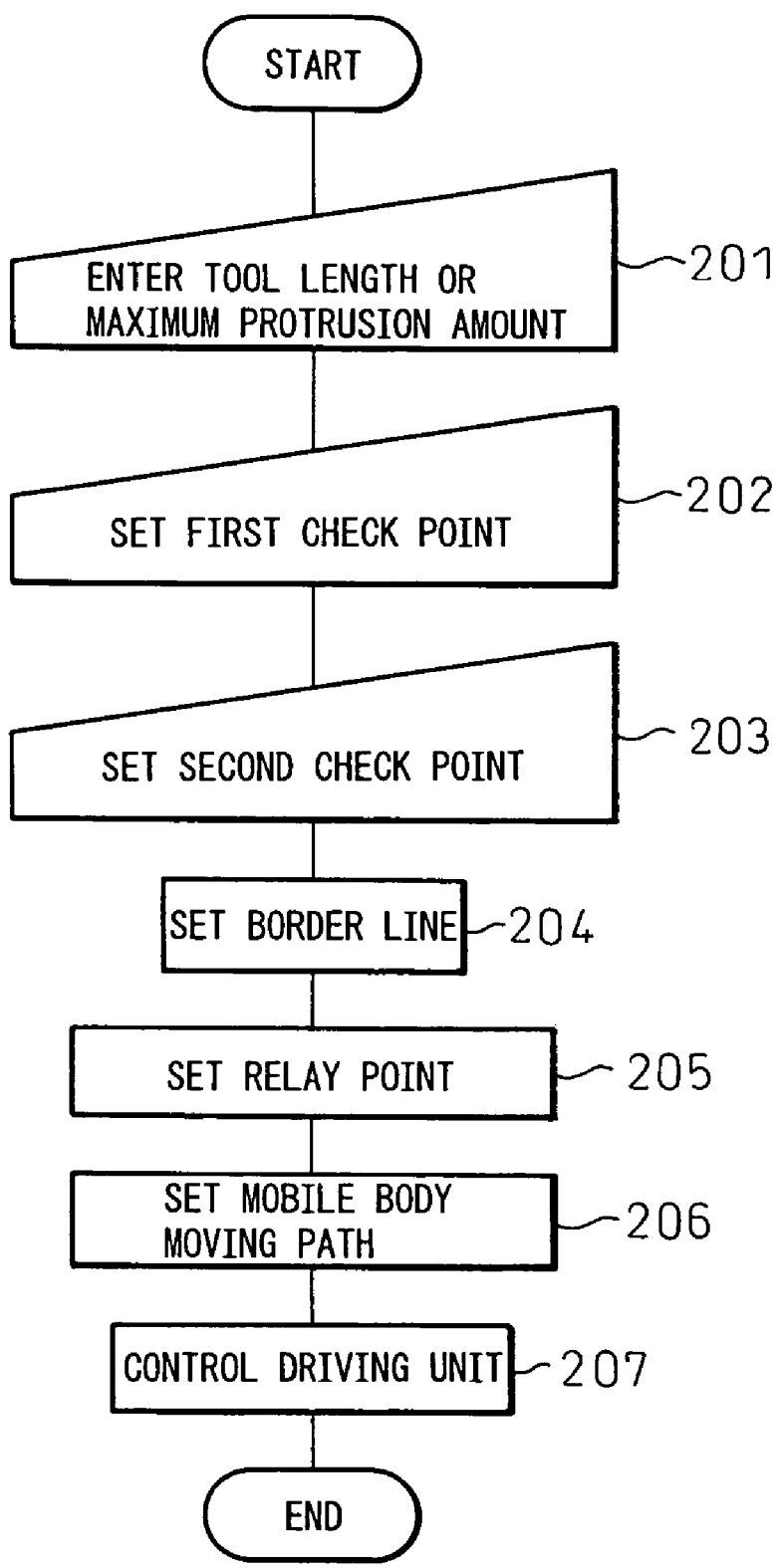
FIG. 23 is a flowchart showing one embodiment for carrying out the mobile body moving method according to the present invention.

FIG. 22 is a schematic diagram showing the positional relationship between the mobile body and the stationary blocks in the machine tool when the mobile body is driven by the controller that can implement the mobile body moving method of the present invention. The machine tool 200 shown includes the mobile body 240 and the two stationary block 250 and 260. In the illustrated example, the mobile body is preferably a back spindle post equipped with a back spindle 254 and a tool post to which a plurality of first tools 256 are detachably mounted. One stationary block 250 is a spindle post equipped with a spindle 252 for rotatably holding a first workpiece designated as work W1 here, and the other stationary block 260 is preferably a stationary tool post to which a plurality of second tools 258 are detachably mounted. The center axis of the spindle 252 of the stationary block 250 as well as that of the back spindle 254 of the mobile body 240 is parallel to the Z axis, and the back spindle 254 is disposed so as to face the spindle 252. The mobile body 240 is movable in the Z-axis direction as well as in the X-axis direction perpendicular to the Z axis, and the first tools 256 mounted on the mobile body 240 are fixed to the tool post so that when the mobile body 240 is moved to a position (not shown) located downward by a prescribed distance away from a first position P1, the tools can cut the work W1 held on the spindle 252. Further, when the mobile body 240 is moved to P1, the work W1 can be transferred between the spindle 252 and the back spindle 254. On the other hand, the second tools 258 are fixed to the stationary block or the stationary tool post 260 so that when the mobile body 240 is moved to a position P2, the tools can cut a second workpiece designated as work W2 rotatably held on the back spindle 254 of the mobile body 240.

As described above, at the first position P1, the first tools 256 mounted on the mobile body 240 can machine the work W1 held on the spindle 252 of the stationary block 250, and at the second position P2, the second tools 258 mounted on the stationary block 260 can machine the work W2 held on the back spindle 254 of the mobile body 240. The mobile body 240 moves from the first position P1 to the second position P2, for example, in the following case; that is, after the work W1 chucked on the spindle 252 has been machined by the first tools 256 mounted on the mobile body 240, the work W1 is transferred from the spindle 252 to the back spindle 254 so that the opposite side of the work W1 can be machined by the second tools 258 mounted on the stationary block 260. Conversely, the mobile body 240 moves from the second position P2 to the first position P1, for example, in the following case; that is, after the work W2 chucked on the back spindle 254 has been machined by the second tools 258 mounted on the stationary block 260, the work W2 is transferred from the back spindle 254 to the spindle 252 so that the opposite side of the work W2 can be machined by the first tools 256 mounted on the mobile body 240. The mobile body 240 can also be moved to a third position P3 separated some distance away from the stationary blocks, as shown in the left side of FIG. 22.

When the mobile body 240 located at the third position P3 is to be moved to the first or second position P1 or P2, the mobile body 240 can be moved along a rectilinear moving path (only the path leading to the second position P2 is shown in the figure) since there is no obstacle between the mobile body 240 and the stationary block 250 or 260. However, when the mobile body 240 is to be moved from the first position P1 to the second position P2, if the mobile body 240 were moved in a rectilinear path, it would interfere with the stationary block 260. Accordingly, in this case, the mobile body moving path is determined using the moving method according to the present invention. How this is done will be described below by referring to FIG. 22 in conjunction with FIG. 23.

First, the operator enters the dimensions of the first tools 256 and second tools 258 mounted on the mobile body 240 and stationary block 260, respectively, or the amount of maximum tool end protrusion (step 201). Here, the amount of maximum protrusion refers to the distance between the forward end of the tool whose forward end protrudes most among the plurality of tools mounted on the mobile body 240 or stationary block 260 and a preset reference position on the mobile body 240 or stationary block 260, as measured along the Z-axis direction, i.e., the tool length direction. A suitable fixed position can be set as the reference position; for example, any suitable position on the base to which the tools are mounted may be taken as the reference position.

Next, based on the value entered in step 201 and on the dimensions of the mobile body 240 set in advance or entered by the operator, the processing section of the controller, i.e., the CPU, sets a first interference check point 246 on the mobile body 240 (step 202). The first interference check point 246 is set as the point on the mobile body 240 that comes closest to the stationary block 260 when the mobile body 240 moves from the position P1 to the position P2 over the shortest distance without interfering with the stationary block 260. In the present embodiment, to facilitate the setting, the first interference check point 246 is set as the point where a straight line that is tangent to the forward end of the tool whose forward end protrudes most among the plurality of first tools 256 mounted on the mobile body 240 or to the forward end of the work W2 held on the back spindle 254, whichever protrudes farther toward the stationary block 250, and that extends parallel to the X axis, intersects a straight line that passes through an end point of the mobile body 240 which is closest to the stationary block 260 in the X-axis direction, and that is parallel to the Z axis.

Next, based on the value entered in step 201 and on the dimensions of the stationary block 260 set in advance or entered by the operator, the processing section of the controller, i.e., the CPU, sets a second interference check point 266 on the stationary block 260, which is used to determine whether the stationary block 260 interferes with the mobile body 240 when the mobile body 240 moves (step 203). Similarly to the first interference check point 246, the second interference check point 266 is set as the point on the stationary block 260 that comes closest to the mobile body 240 when the mobile body 240 moves from the position P1 to the position P2 (or vice versa) over the shortest distance without interfering with the stationary block 260. In the present embodiment, to facilitate the setting, the second interference check point 266 is set as the point where a straight line that is tangent to the forward end of the tool whose forward end protrudes most among the plurality of second tools 258 mounted on the stationary block 260, and that extends parallel to the X axis, intersects a straight line that passes through an end point of the stationary block 260 which is closest to the mobile body 240 in the X-axis direction, and that is parallel to the Z axis. In other words, the second interference check point, as well as the first interference check point, is set at one corner of a rectangle when the shape of the stationary block 260 or the mobile body 240 is approximated by the rectangle. It will therefore be appreciated that the mobile body and the stationary block may each be approximated by a circle, an ellipse, or a polygon other than a rectangle, depending on its actual shape, and the first and second interference check points may each be set at a suitable point within its shape.

The protruding length of each tool mounted on the mobile body 240 or the stationary block 260 and the protruding length of the work W2 from the back spindle 254 may be entered in advance when creating programs for the mobile body 240 and the stationary block 260.

Next, the processing section 216 of the controller 210 sets a border line B based on the amount of maximum protrusion of the second tools 258 of the stationary block 260 and on the predetermined dimensions of the stationary block 260 (step 204). The border line B is used to determine whether the mobile body 240 should be moved in accordance with the moving method of the present invention or may be moved simply in a rectilinear fashion, by checking on which side of the border line B the first interference check point 246 of the mobile body 240 positioned at the first position P1 is located. In the present embodiment, the border line B is set as a straight line that is tangent to the forward end of the tool whose forward end protrudes most among the second tools 258, and that extends in the X direction. In other words, the border line B is a straight line extending parallel to the X axis and passing through the second interference check point 266. Alternatively, the border line B may be set in advance as a straight line that is parallel to the X axis but does not necessarily pass through the second interference check point 266; in this case, the second tools 258 may be mounted on the stationary block 260 in such a manner that the tools do not interfere with the border line.

Next, in order to prevent the mobile body 240 from interfering with the stationary block 260 during the movement of the mobile body 240, a relay point 270 is set through which the locus T that the first interference check point 246 describes as the mobile body 240 moves should pass (step 205). Here, the relay point 270 is set as a point that lies on the border line B set in step 204, and that is located outside a rectangle defining the stationary block 260 (that is, outward of the second interference check point 266 with respect to the stationary block 260). Preferably, the controller 210 not shown sets the relay point 270 at an optimum position that can minimize at least one of the length of the locus T of the first interference check point 246, the required moving time of the mobile body 240, the power consumption required for the movement, etc.

Figure 24:
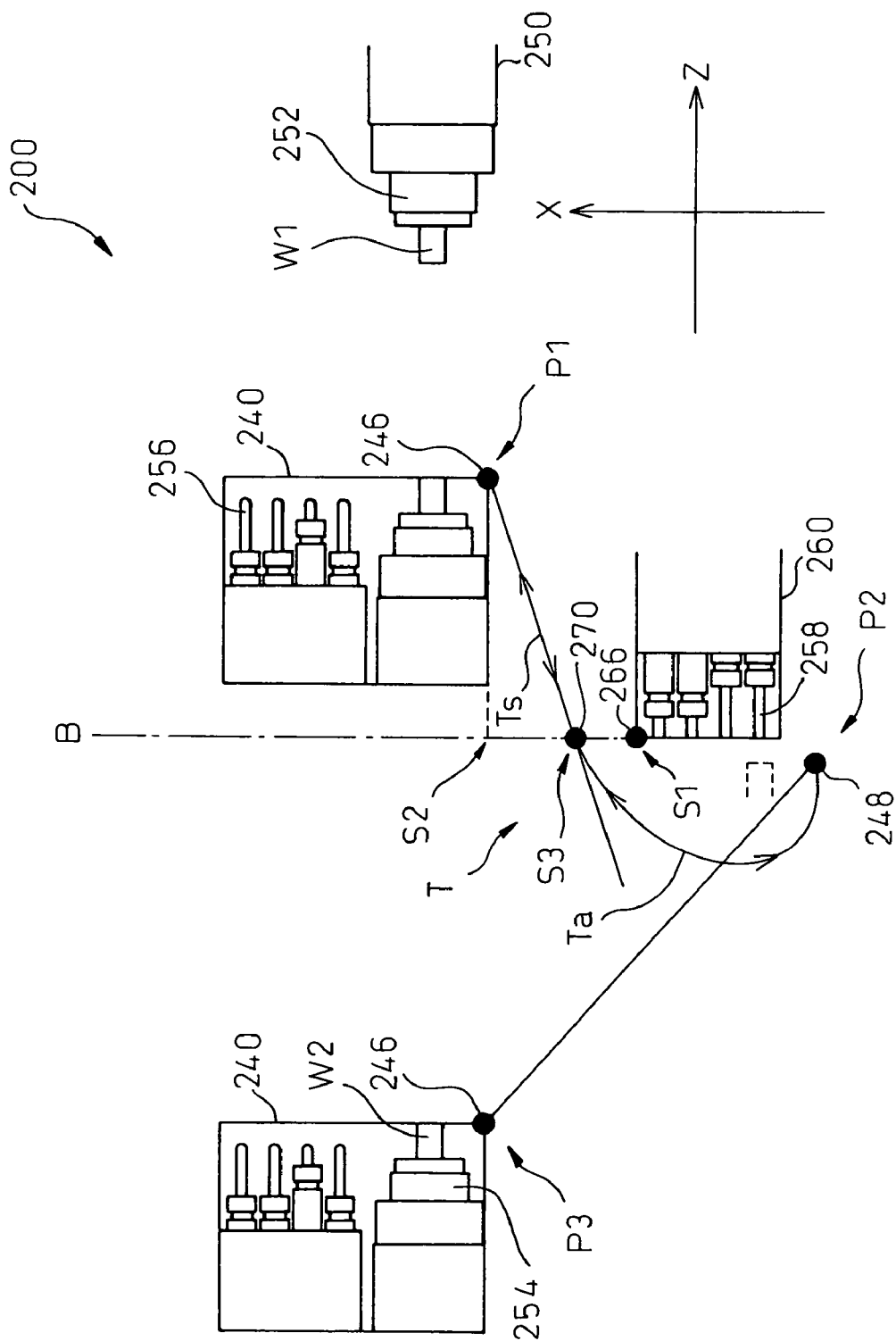
FIG. 24 is a schematic diagram showing a preferred example of the moving path of the mobile body in the machine tool according to the present invention.

Here, when the mobile body 240 moves so that the first interference check point 246 first moves rectilinearly from the first position P1 toward the relay point 270 and then moves rectilinearly from the relay point 270 toward the second position P2, as shown in FIG. 22, the mobile body 240 is rapidly decelerated and accelerated (that is, temporarily stopped and then restarted) as it passes through the relay point 270; as a result, undesirable vibrations, similar to those associated with the prior art U-shaped movement, can occur in the machine tool when the first interference check point 246 passes through the relay point 270. In view of this, in the present invention, the locus T is set so that it does not contain such a corner that requires rapid deceleration and acceleration of the mobile body 240 when changing direction, but contains an arcuate line at least in a portion thereof (step 206). More specifically, as shown in FIG. 24, the locus T comprises a straight line Ts from the first interference check point 246 at the first position P1 to the relay point 270 and an arcuate line Ta from the relay point 270 to the first interference check point 246 at the second position P2. Here, the straight line Ts is a tangent T to the arcuate line Ta at the relay point 270 where the straight line Ts meets the arcuate line Ta. According to this arrangement, the mobile body 240 can be moved without apparently experiencing deceleration or acceleration and without having to undergo an abrupt direction change. Actually, the driving sources for the respective axes (in the illustrated example, X and Z axes) perform acceleration and deceleration, but as a whole, the mobile body 240 can be moved smoothly without undergoing acceleration or deceleration in a direction along the locus T. As a result, undesirable vibrations such as described above are not generated, and besides, the power consumption and the moving time can be reduced. It will be recognized here that the meeting point of the straight line Ts and the arcuate line Ta need not necessarily coincide with the relay point 270. That is, the relay point 270 may be located on the straight line Ts or on the arcuate line Ta.

Figure 25:
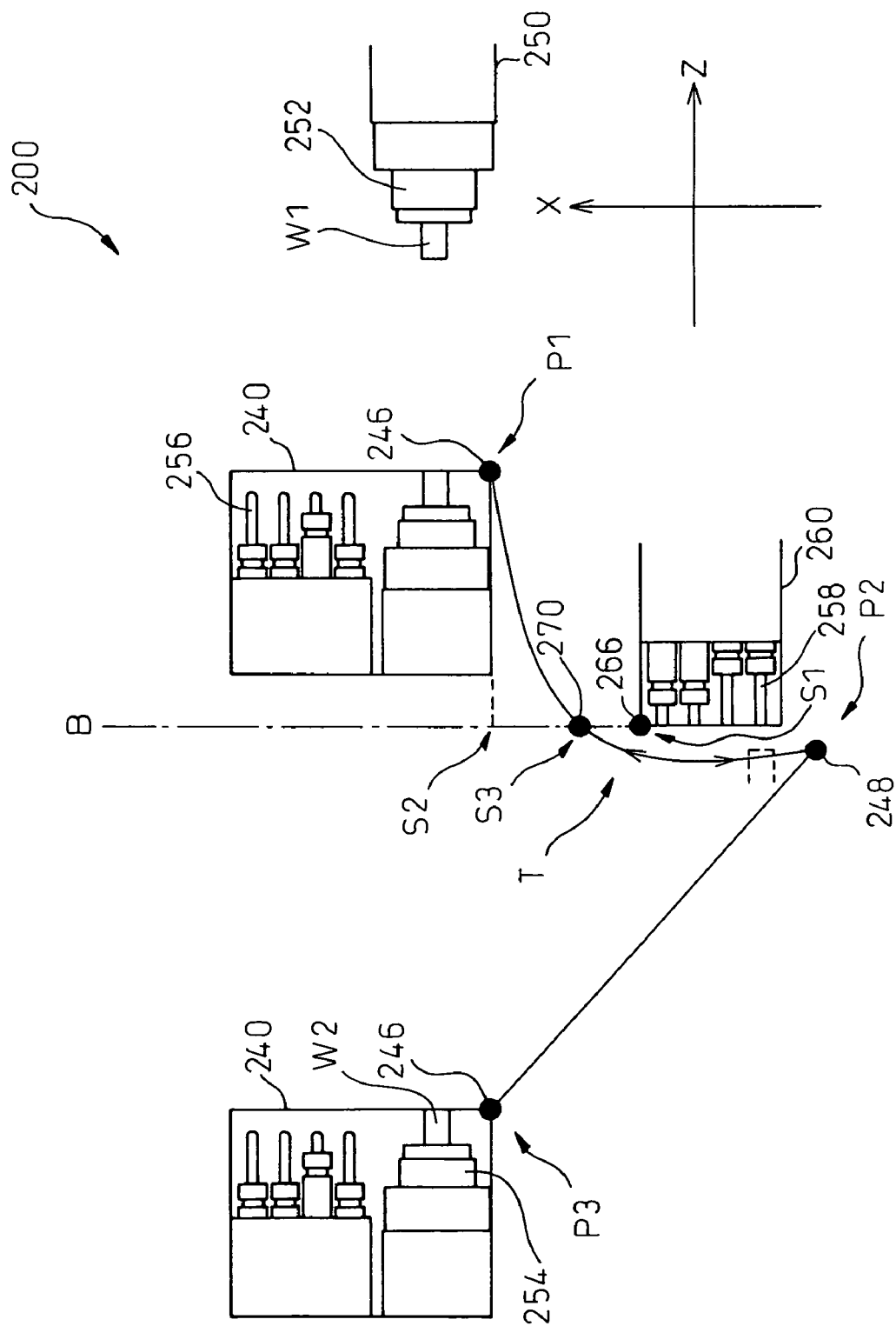
FIG. 25 is a schematic diagram showing another preferred example of the moving path of the mobile body in the machine tool according to the present invention

Further, as shown in FIG. 25, for example, the locus T may be formed so as not to contain any straight lines but so as to contain only an arcuate line. In this case also, undesirable vibrations do not occur, because the mobile body 240 moves by gradually changing direction along the arcuate line, without undergoing an abrupt direction change at any point on the locus T. Either the combination of the straight line and the arcuate line shown in FIG. 24 or the arcuate line shown in FIG. 25 can be selected as the locus T by the controller 210 by considering the length of the locus T of the first interference check point 246, the required moving time of the mobile body 240, the power consumption required for the movement, etc.

The relay point 270 is set at the optimum position by considering the required moving time of the mobile body 240, etc. as described above; next, one example of how this is set will be described. First, as shown in FIG. 24 or 25, the following three points are set: a point S1 which lies on the border line B and through which the mobile body 240 passes when it comes closest to the stationary block 260, that is, the point that is closest to the second interference check point 266 and outside the stationary block 260; a point of intersection S2 at which the straight line extending from the first interference check point 246 in parallel to the Z axis when the mobile body 240 is located at the position P1 intersects the border line B; and a point S3 which is located between S1 and S2 on the border line B. Next, when executing the machining program that causes the mobile body 240 to move from P1 to P2, the mobile body 240 is moved along each of three possible paths in which the first interference check point 246 passes through one of the above points S1 to S3, and the moving time is measured; then, of the three points S1 to S3, the point that yielded the shortest moving time is selected as the relay point 270 and stored in the RAM or the like. Here, S3 may be set at a point intermediate between S1 and S2, or may be set at an appropriate point precalculated based on the positional relationship between P1 and P2 or estimated from previous results of movement.

Preferably, as shown in FIG. 24, the direction in which the locus T is pointing when the mobile body 240 has reached the second position substantially coincides with the axial direction (the Z-axis direction in FIG. 24) of the workpiece to be transferred to and from the stationary block 260, from the standpoint of facilitating the transfer of the workpiece. When the moving path of the mobile body 240 contains an arcuate line, such movement can be accomplished regardless of where the mobile body 240 is located before the movement.

Finally, the driving unit (not shown) for moving the mobile body 240 is controlled by the processing section of the controller 210, i.e., the CPU 216, (in step 207) in such a manner that the first interference check point 246 of the mobile body 240 moves along the locus T set in step 206. The driving unit drives the driving sources for the respective axes in accordance with the instruction from the processing section of the controller 210 and thereby accomplishes the smooth movement of the mobile body 240 along the locus T.

In the present embodiment, whether the mobile body 240 may be moved rectilinearly or should be moved along a path determined by the method of the present invention is determined by on which side of the border line B the first interference check point 246 of the mobile body 240 before the movement is located. In the illustrated example, when the first interference check point 246 before the movement is located on the left-hand side of the border line B, the mobile body 240 can be moved rectilinearly, but when it is located on the right-hand side, the mobile body 240 should be moved along a moving path containing an arcuate line in accordance with the moving method of the present invention.

As described above, since the locus of the interference check point does not contain a sharp angular corner but at least partially contains an arcuate line, the mobile body can be moved smoothly without experiencing acceleration or deceleration except when starting and when stopping, and vibrations that can adversely affect the machining accuracy and service life of the machine tool can thus be suppressed. Furthermore, as the locus passes through the predetermined relay point, the mobile body is reliably prevented from interfering with other members, unlike the case where the U-shaped moving path of the prior art is simply replaced by an arcuate line or a combination of an arcuate line and a straight line.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A movement controller, for use in a machine tool having at least one mobile body movable between a first position and a second position in a coordinate system containing mutually perpendicular first and second axes, and a first axis driving unit and a second axis driving unit for moving the mobile body in directions parallel to the first and second axes, respectively, the movement controller being configured to control the first axis driving unit and the second axis driving unit so that the mobile body moving between the first position and the second position passes through at least one direction change point that does not lie on a straight line joining the first position to the second position, wherein the movement controller comprises a driving control section for controlling the first axis driving unit and the second axis driving unit so that after the mobile body has reached the at least one direction change point, the first axis driving unit accelerates and decelerates the mobile body in the first-axis direction with an acceleration and deceleration smaller than a predetermined first maximum acceleration and first maximum deceleration that the first axis driving unit can provide, and so that the acceleration and deceleration is performed continuously over a part or the entire length of the time during which the second axis driving unit is driven after the direction change point is reached.

2. The movement controller as set forth in claim 1, wherein when the movement controller controls the first axis driving unit and the second axis driving unit so that the mobile body passes through first and second direction change points whose coordinates along the first axis are the same, the driving control section controls the first axis driving unit and the second axis driving unit so that the first axis driving unit accelerates and decelerates the mobile body in the above described manner while the mobile body is being moved by the second axis driving unit from the first direction change point to the second direction change point.

3. The movement controller as set forth in claim 2, wherein the driving control section controls the first axis driving unit and the second axis driving unit such that the first axis driving unit accelerates the mobile body in the first-axis direction with the first maximum acceleration, and then drives the mobile body constantly at a predetermined first maximum moving speed until the mobile body reaches the first direction change point;

after the mobile body has reached the first direction change point, the second axis driving unit accelerates the mobile body in the second-axis direction with a predetermined second maximum acceleration toward the second direction change point and, after reaching a predetermined second maximum moving speed, the second axis driving unit drives the mobile body constantly at that speed and then decelerates the mobile body with a predetermined second maximum deceleration just before reaching the second direction change point at which the movement in the second-axis direction stops; and after the mobile body has reached the first direction change point, the first axis driving unit decelerates the mobile body with a deceleration smaller than the first maximum deceleration so that the moving speed of the mobile body in the first-axis direction becomes zero when the mobile body reaches a midpoint between the first direction change point and the second direction change point and, after reaching the midpoint, the first axis driving unit accelerates the mobile body with an acceleration smaller than the first maximum acceleration in a direction opposite to the direction in which the mobile body was moved up to the midpoint, and drives the mobile body at the first maximum moving speed after reaching the second direction change point.

4. The movement controller as set forth in claim 1, wherein when the machine tool has first and second mobile bodies movable relative to each other, and when the movement controller controls the first axis driving unit and the second axis driving unit so that the first mobile body passes through first and second direction change points whose coordinates along the first axis are the same, the driving control section controls the first axis driving unit and the second axis driving unit so that the first axis driving unit accelerates and decelerates the first mobile body in the earlier described manner while the first mobile body is being moved from the first direction change point to the second direction change point in a relative fashion by moving the second mobile body by the second axis driving unit.

5. The movement controller as set forth in claim 4, wherein the driving control section controls the first axis driving unit and the second axis driving unit such that the first axis driving unit accelerates the first mobile body in the first-axis direction with the first maximum acceleration, and then drives the first mobile body constantly at a predetermined first maximum moving speed until the first mobile body reaches the first direction change point;

after the first mobile body has reached the first direction change point, the second axis driving unit accelerates the second mobile body with a predetermined second maximum acceleration, and after reaching a predetermined second maximum moving speed, the second axis driving unit drives the second mobile body constantly at that speed and then decelerates the second mobile body with a predetermined second maximum deceleration just before reaching the second direction change point at which the movement in the second-axis direction stops; and after the first mobile body has reached the first direction change point, the first axis driving unit decelerates the first mobile body with a deceleration smaller than the first maximum deceleration so that the moving speed of the first mobile body in the first-axis direction becomes zero when the first mobile body reaches a midpoint between the first direction change point and the second direction change point and, after reaching the midpoint, the first axis driving unit accelerates the first mobile body with an acceleration smaller than the first maximum acceleration in a direction opposite to the direction in which the first mobile body was moved up to the midpoint, and drives the first mobile body at the first maximum moving speed after reaching the second direction change point.

6. The movement controller as set forth in claim 1, wherein when the movement controller controls the first axis driving unit and the second axis driving unit so that the mobile body passes through one direction change point whose coordinate along the first axis is the same as that of the second position, the driving control section controls the first axis driving unit and the second axis driving unit so that the first axis driving unit accelerates and decelerates the mobile body in the earlier described manner while the mobile body is being moved by the second axis driving unit from the direction change point to the second position.

7. The movement controller as set forth in claim 6, wherein the driving control section controls the first axis driving unit and the second axis driving unit such that the first axis driving unit accelerates the mobile body in the first-axis direction with the first maximum acceleration, and then drives the mobile body constantly at the first maximum moving speed until the mobile body reaches the direction change point;

after the mobile body has reached the direction change point, the second axis driving unit accelerates the mobile body in the second-axis direction with a predetermined second maximum acceleration toward the second position, and after reaching a predetermined second maximum moving speed, the second axis driving unit drives the mobile body constantly at that speed and then decelerates the mobile body with a predetermined second maximum deceleration just before reaching the second position so that the mobile body stops at the second position; and after the mobile body has reached the direction change point, the first axis driving unit decelerates the mobile body with a deceleration smaller than the first maximum deceleration so that the moving speed of the mobile body in the first-axis direction becomes zero before the mobile body reaches the second position and, when the speed in the first-axis direction becomes zero, the first axis driving unit accelerates the mobile body with an acceleration smaller than the first maximum acceleration in a direction opposite to the first direction, and then decelerates the mobile body with a deceleration smaller than the first maximum deceleration so that when the second-axis coordinate of the mobile body becomes equal to the second-axis coordinate of the second position, the first-axis coordinate of the mobile body also equals the first-axis coordinate of the second position, and so that the mobile body stops upon reaching the second position.

8. The movement controller as set forth in claim 1, wherein when the machine tool has first and second mobile bodies movable relative to each other, and when the movement controller controls the first axis driving unit and the second axis driving unit so that the first mobile body passes through one direction change point whose coordinate along the first axis is the same as that of the second position, the driving control section can control the first axis driving unit and the second axis driving unit so that the first axis driving unit accelerates and decelerates the first mobile body in the earlier described manner while the first mobile body is being moved from the direction change point to the second position in a relative fashion by moving the second mobile body by the second axis driving unit.

9. The movement controller as set forth in claim 8, wherein the driving control section controls the first axis driving unit and the second axis driving unit such that the first axis driving unit accelerates the first mobile body in the first-axis direction with the first maximum acceleration, and then drives the first mobile body constantly at the first maximum moving speed until the first mobile body reaches the direction change point;

after the first mobile body has reached the direction change point, the second axis driving unit accelerates the second mobile body with a predetermined second maximum acceleration, and after reaching a predetermined second maximum moving speed, the second axis driving unit drives the second mobile body constantly at that speed and then decelerates the second mobile body with a predetermined second maximum deceleration just before reaching the second position at which the movement in the second-axis direction stops; and after the first mobile body has reached the direction change point, the first axis driving unit decelerates the first mobile body with a deceleration smaller than the first maximum deceleration so that the moving speed of the first mobile body in the first-axis direction becomes zero before the first mobile body reaches the second position and, when the speed in the first-axis direction becomes zero, the first axis driving unit accelerates the first mobile body with an acceleration smaller than the first maximum acceleration in a direction opposite to the first direction, and then decelerates the first mobile body with a deceleration smaller than the first maximum deceleration so that when the second-axis coordinate of the first mobile body becomes equal to the second-axis coordinate of the second position, the first-axis coordinate of the first mobile body also equals the first-axis coordinate of the second position, and so that the first mobile body stops upon reaching the second position.

10. A machine tool comprising the movement controller as set forth in claim 1.

11. A movement controller, for use in a machine tool having at least one mobile body movable between a first position and a second position in a coordinate system containing mutually perpendicular first and second axes, wherein the movement controller for moving the mobile body between the first position and the second position comprises:

a storage section which stores a first maximum moving speed for the mobile body to be moved along the first axis, a first maximum acceleration and first maximum deceleration for the mobile body to be accelerated and decelerated between the first maximum moving speed and zero speed, a second maximum moving speed for the mobile body to be moved along the second axis, and a second maximum acceleration and second maximum deceleration for the mobile body to be accelerated and decelerated between the second maximum moving speed and zero speed;

a direction change point setting section which, based on the specified first and second positions, sets a direction change point within the coordinate system at a position spaced away from a straight line joining the first and second positions;

an acceleration/deceleration computing section which computes, as values smaller than the first maximum acceleration and the first minimum deceleration, the acceleration and deceleration with which the mobile body is accelerated and decelerated along the first axis during a period starting from the time that the mobile body passes the direction change point set by the direction change point setting section until the time that the mobile body reaches the next direction change point or a stopping point; a mode-of-movement computing section which, based on the acceleration and deceleration computed by the acceleration/deceleration computing section and on the second maximum acceleration and the second maximum deceleration stored in the storage section, computes the mode of movement of the mobile body so that the movement of the mobile body along the second axis is completed while the mobile body is being accelerated and decelerated along the first axis; and a driving control section which moves the mobile body from the first position to the second position via the direction change point by controlling the movement of the mobile body along the first axis and the movement of the mobile body along the second axis in accordance with the mode of movement computed by the mode-of-movement computing section.

12. A moving method, for use in a machine tool having at least one mobile body movable between a first position and a second position in a coordinate system containing mutually perpendicular first and second axes, and a first axis driving unit and a second axis driving unit for moving the mobile body in directions parallel to the first and second axes, respectively, the method being adapted to move the mobile body by controlling the first axis driving unit and the second axis driving unit so that the mobile body moving between the first position and the second position passes through at least one direction change point that does not lie on a straight line joining the first position to the second position, wherein the method comprises the steps of:

after the mobile body has reached the at least one direction change point, accelerating and decelerating the mobile body in the first-axis direction by the first axis driving unit with an acceleration and deceleration smaller than a predetermined first maximum acceleration and first maximum deceleration that the first axis driving unit can provide; and performing the acceleration and deceleration continuously over a part or entire length of a time during which the second axis driving unit is driven after the direction change point is reached.

13. A moving method, for use in a machine tool having at least one mobile body movable between a first position and a second position in a coordinate system containing mutually perpendicular first and second axes, wherein the moving method for moving the mobile body between the first position and the second position comprises the steps of:

setting a first maximum moving speed for the mobile body to be moved along the first axis and a first maximum acceleration and first maximum deceleration for the mobile body to be accelerated and decelerated between the first maximum moving speed and zero speed;

setting a second maximum moving speed for the mobile body to be moved along the second axis and a second maximum acceleration and second maximum deceleration for the mobile body to be accelerated and decelerated between the second maximum moving speed and zero speed;

setting a direction change point within the coordinate system at a position spaced away from a straight line joining the first and second positions;

when moving the mobile body from the first position to the second position via the direction change point, accelerating and decelerating the mobile body along the first axis with an acceleration and deceleration smaller than the first maximum acceleration and the first minimum deceleration during a period starting from the time that the mobile body passes the direction change point until the time that the mobile body reaches the next direction change point or a stopping point, while at the same time, moving the mobile body with the second maximum acceleration and the second maximum deceleration along the second axis and completing the movement along the second axis while the mobile body is being moved along the first axis.

14. The controller, for use in a machine tool having a mobile body movable along an arbitrary direction between arbitrary points set within a two-dimensional plane, a stationary block placed within a movable range of the mobile body, and a driving unit for moving the mobile body in the arbitrary direction to accomplish the positioning thereof, wherein the controller for controlling the driving unit comprises:

a processing section which sets a moving path that the mobile body should take between the arbitrary positions set as first and second positions so that the mobile body does not interfere with the stationary block and so that the moving path does not contain a sharp angular corner but at least partially contains an arcuate line; and a driving control section which controls the driving unit so that the mobile body moves along the moving path set by the processing section.

15. The controller as set forth in claim 14, wherein the processing section sets a first interference check point on the mobile body as a point that comes closest to the stationary block when the mobile body moves from the first position to the second position over the shortest distance, a second interference check point on the stationary block as a point that comes closest to the mobile body when the mobile body moves from the first position to the second position over the shortest distance, and a relay point through which the first interference check point passes during the movement of the mobile body along the moving path so that the first interference check point and the second interference check point do not interfere with each other, and wherein the driving control section moves the mobile body so that the first interference check point on the mobile body passes through the relay point, based on the first interference check point, the second interference check point, and the relay point set by the processing section.

16. A controller, for use in a machine tool having: a spindle post for rotatably supporting a spindle capable of rotating with first work held thereon; a back spindle post equipped with a back spindle, which has an axis parallel to the axis of the spindle, is disposed so as to face the spindle, and is capable of rotating with second work held thereon, and one or more first tools which perform cutting operations on the first work held on the spindle, wherein the back spindle post is movable in the axial direction of the spindle as well as in an arbitrary direction perpendicular to the axis; a stationary tool post disposed within a movable range of the back spindle post and equipped with one or more second tools which performs cutting operations on the second work held on the back spindle; and a driving unit for moving the back spindle post to an arbitrary position in an arbitrary direction to accomplish the positioning thereof, wherein the controller for controlling the driving unit comprises:

a processing section which sets a moving path that the back spindle post should take between the arbitrary positions set as first and second positions, with the stationary tool post interposed therebetween, so that the back spindle post does not interfere with the stationary tool post and so that the moving path does not contain a sharp angular corner but at least partially contains an arcuate line; and a driving control section which controls the driving unit so that the back spindle post moves along the moving path set by the processing section.

17. The controller as set forth in claim 16, wherein the processing section sets a first interference check point as a point of intersection at which a straight line that is tangent to a forward end of the first tool whose forward end protrudes most among the first tools mounted on the back spindle post or to a forward end of the second work held on the back spindle, whichever protrudes farther toward the spindle post, and that is perpendicular to the axis of the back spindle, intersects a straight line that passes through an end point of the back spindle post which is closest to the stationary tool post in the direction of the perpendicular line, and that is parallel to the axis of the back spindle, a second interference check point as a point of intersection at which a straight line that is tangent to a forward end of the second tool whose forward end protrudes most among the second tools mounted on the stationary tool post, and that is perpendicular to the axis of the back spindle, intersects a straight line that passes through an end point of the stationary tool post which is closest to the back spindle post in the direction of the perpendicular line, and that is parallel to the axis of the back spindle, and a relay point through which the first interference check point passes during the movement of the back spindle post along the moving path so that the first interference check point and the second interference check point do not interfere with each other, and wherein the driving control section moves the back spindle post so that the first interference check point on the back spindle post passes through the relay point, based on the first interference check point, the second interference check point, and the relay point set by the processing section.

18. A machine tool comprising the controller as set forth in claim 14.

* * * * *